United States Patent
Regan

Patent Number: 5,460,462
Date of Patent: Oct. 24, 1995

[54] LIQUID AND FLOOD WATER BARRIER WALL FORMING-APPARATUS

[76] Inventor: Patrick Regan, 2923 N. Hatchez Ave., Chicago, Ill. 60634

[21] Appl. No.: 247,257

[22] Filed: May 23, 1994

Related U.S. Application Data

[63] Continuation-in-part of Ser. No. 119,493, Sep. 9, 1993, abandoned.

[51] Int. Cl.$^6$ .................................................. E02B 7/00
[52] U.S. Cl. .................. 405/96; 405/87; 405/92; 405/104
[58] Field of Search .................. 405/114, 115, 405/91, 92, 100, 104, 87, 52, 107; 52/159.14; 137/363

[56] References Cited

U.S. PATENT DOCUMENTS

| | | | |
|---|---|---|---|
| 4,582,451 | 4/1986 | Hollander | 405/104 X |
| 4,881,854 | 11/1989 | Bowe | 405/115 X |
| 5,092,708 | 3/1992 | Kruger | 405/87 X |
| 5,118,217 | 6/1992 | Younes | 405/114 |
| 5,127,766 | 7/1992 | Matsuoka et al. | 405/115 |
| 5,161,911 | 11/1992 | Regan | 405/37 |

*Primary Examiner*—Dennis L. Taylor
*Attorney, Agent, or Firm*—Wallenstein & Wagner, Ltd.

[57] ABSTRACT

A liquid barrier system includes a structure forming a below ground level float-receiving chamber. An inlet passageway for round water or other liquid directs the liquid into the bottom of said chamber to fill the chamber when it is desired that a barrier wall-forming part of the barrier system is to rise above ground level. Where the barrier system is a flood water barrier, the chamber bottom connects with a sewer system so that the chamber does not fill unless flood risk conditions exist, as when sewer back-up occurs. A float structure with which the barrier wall is associated is vertically movable in the chamber from a bottommost position therein when there is no liquid build up therein to an uppermost position when said liquid rises therein where the barrier wall is substantially above ground level. Seals are provided which prevent the liquid from gaining access to said one side of the barrier wall. The seal preferably include surfaces on the housing structure and surfaces on the float structure which surfaces engage and are pressed into sealing relation by the buoyancy forces on the float structure when it reaches its uppermost position.

44 Claims, 26 Drawing Sheets

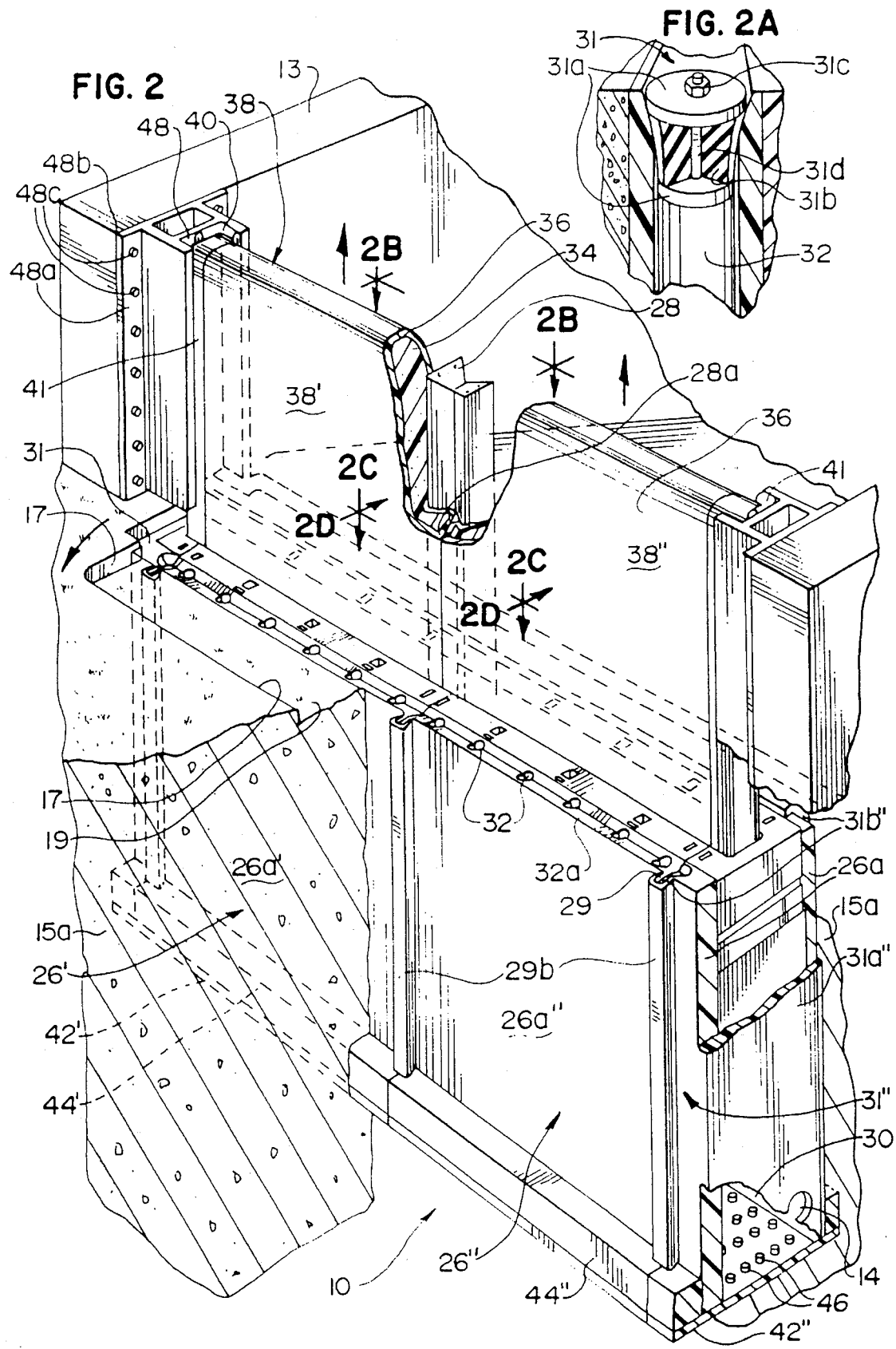

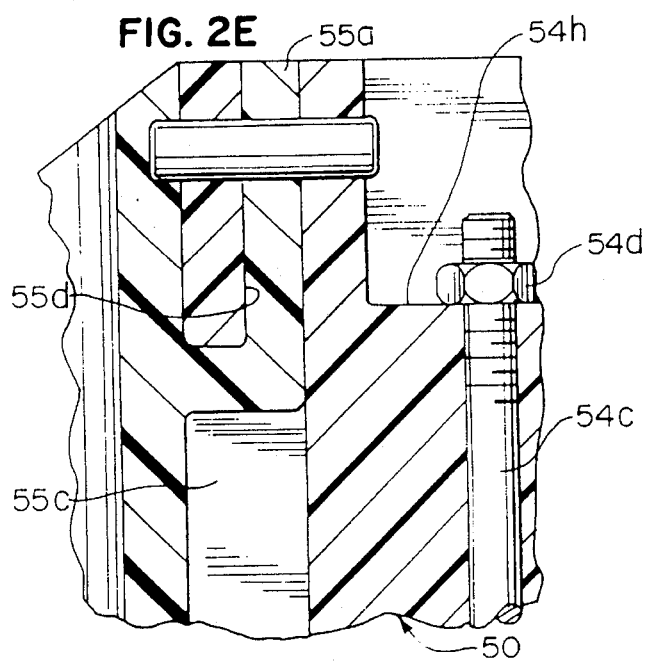
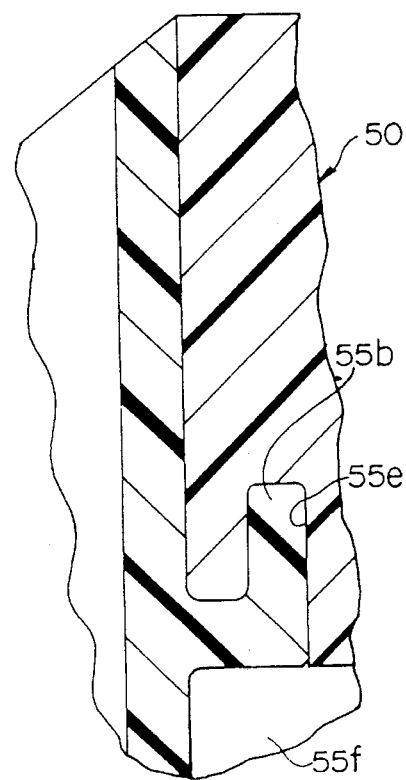

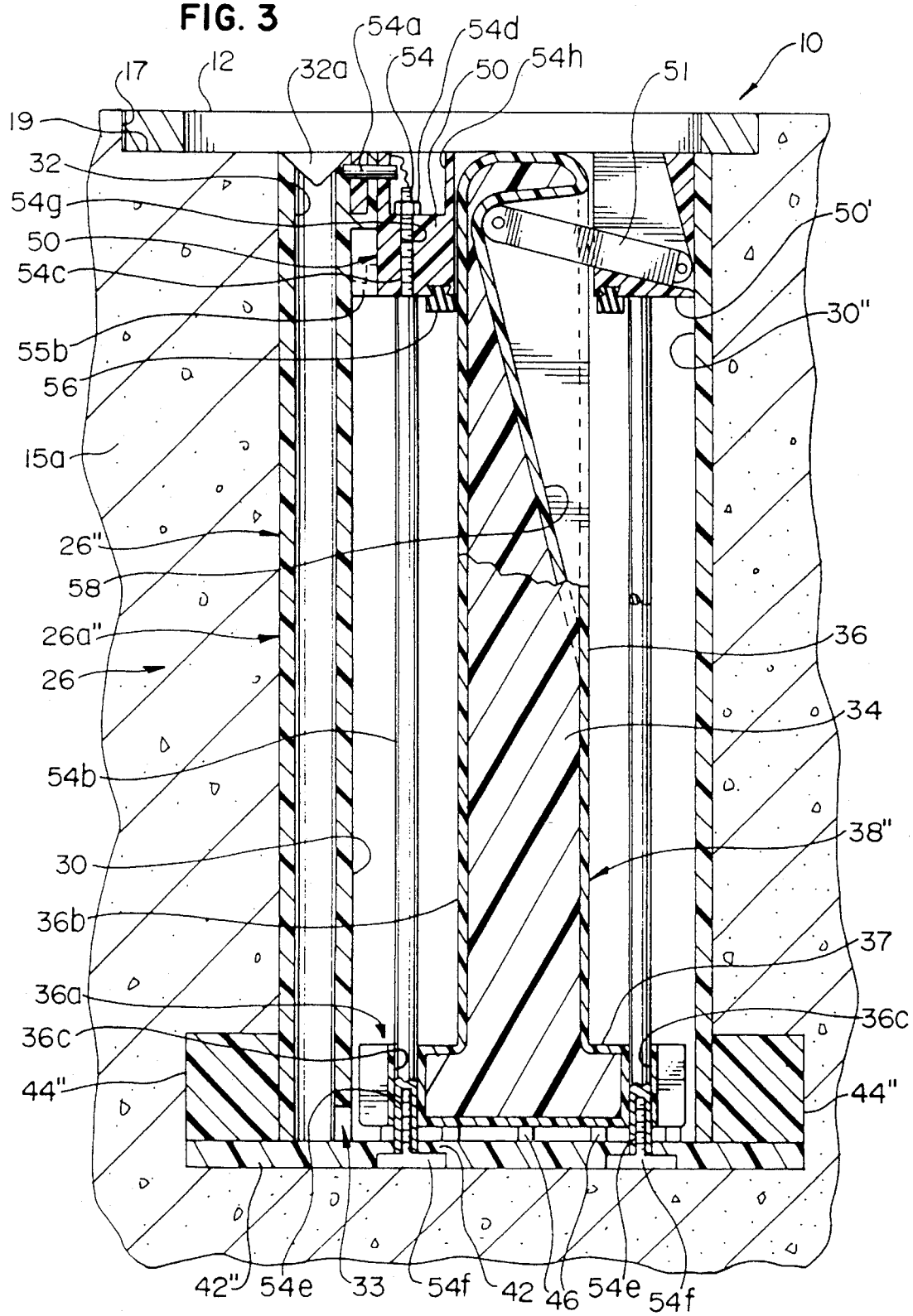

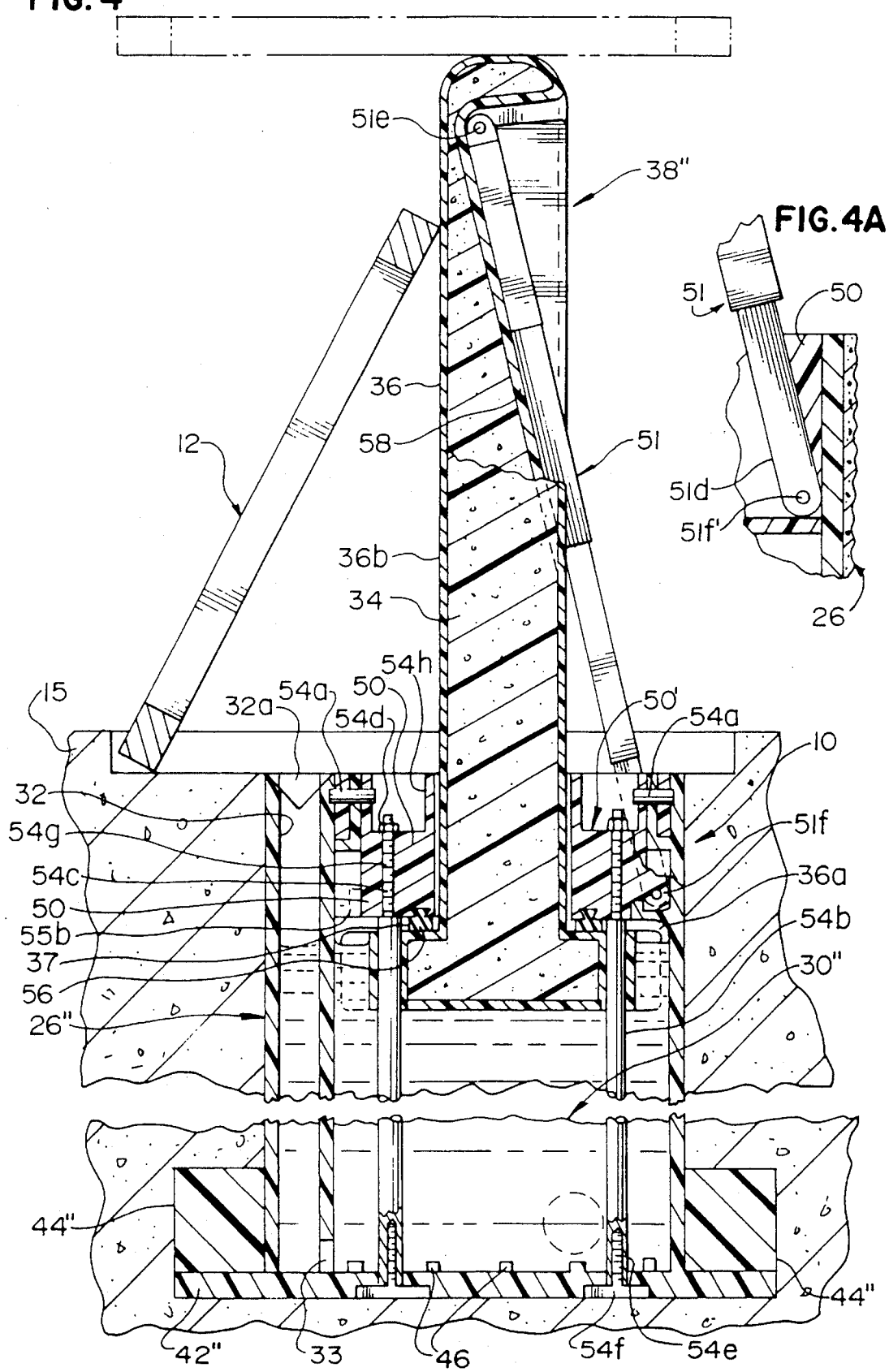

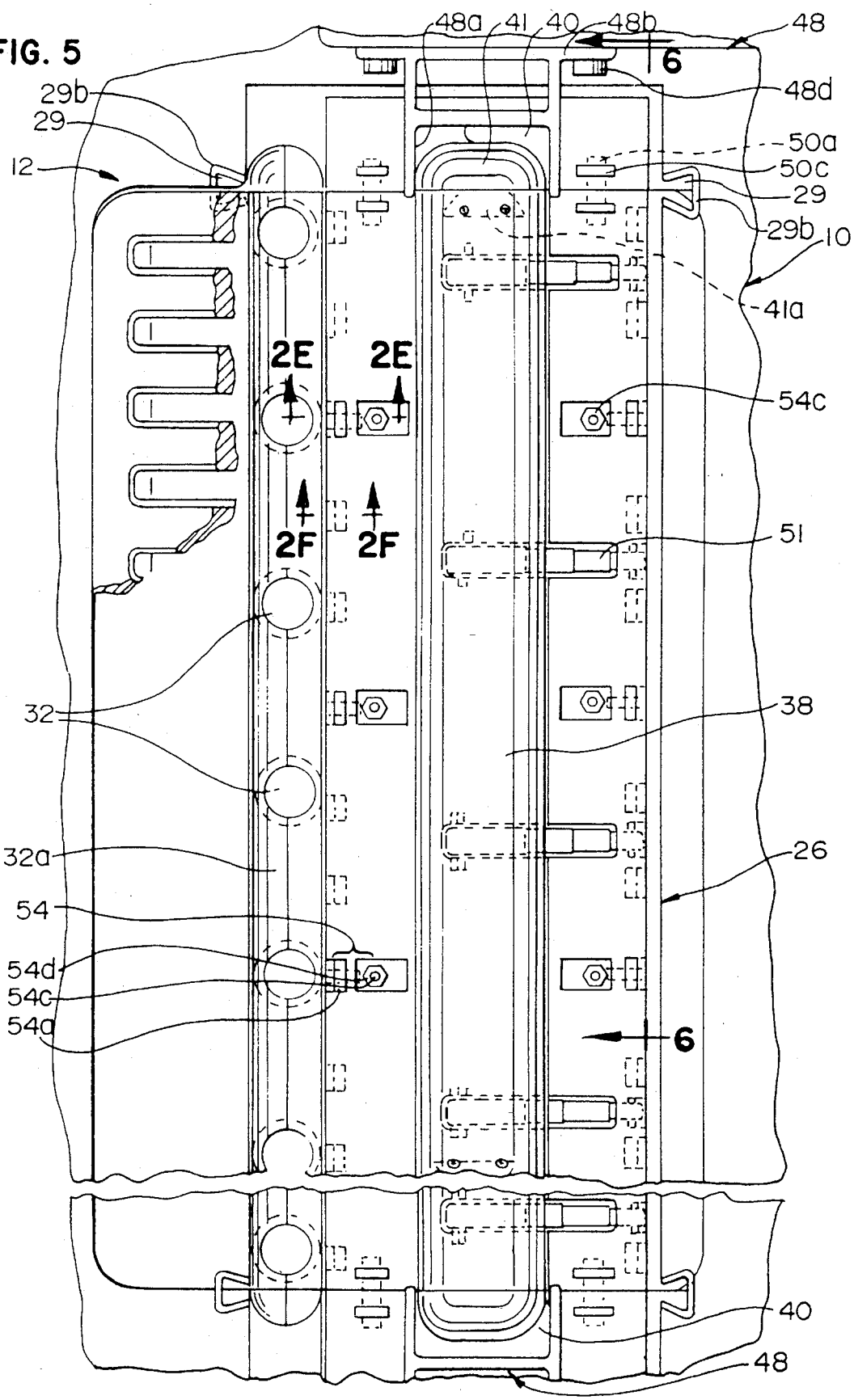

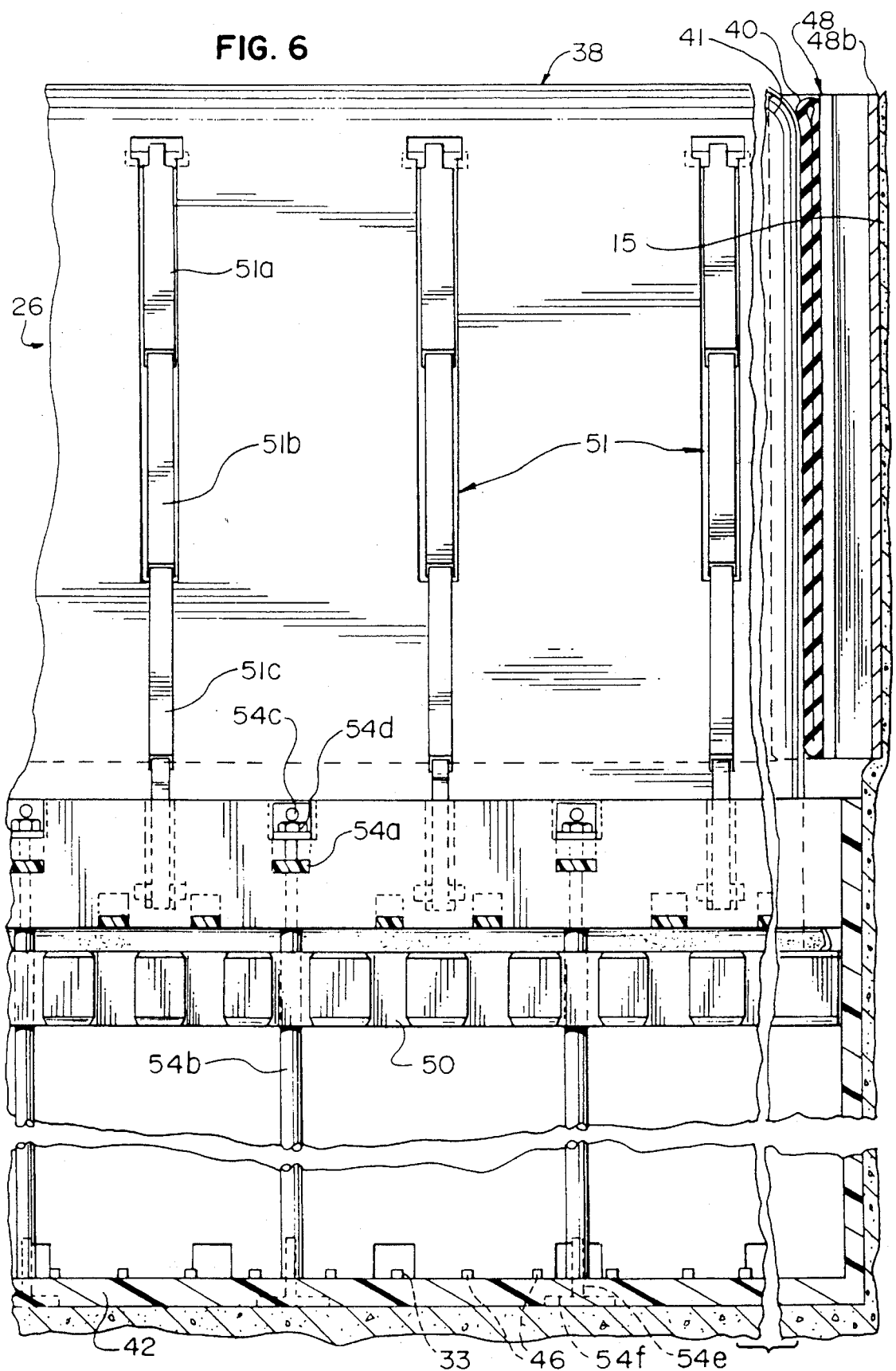

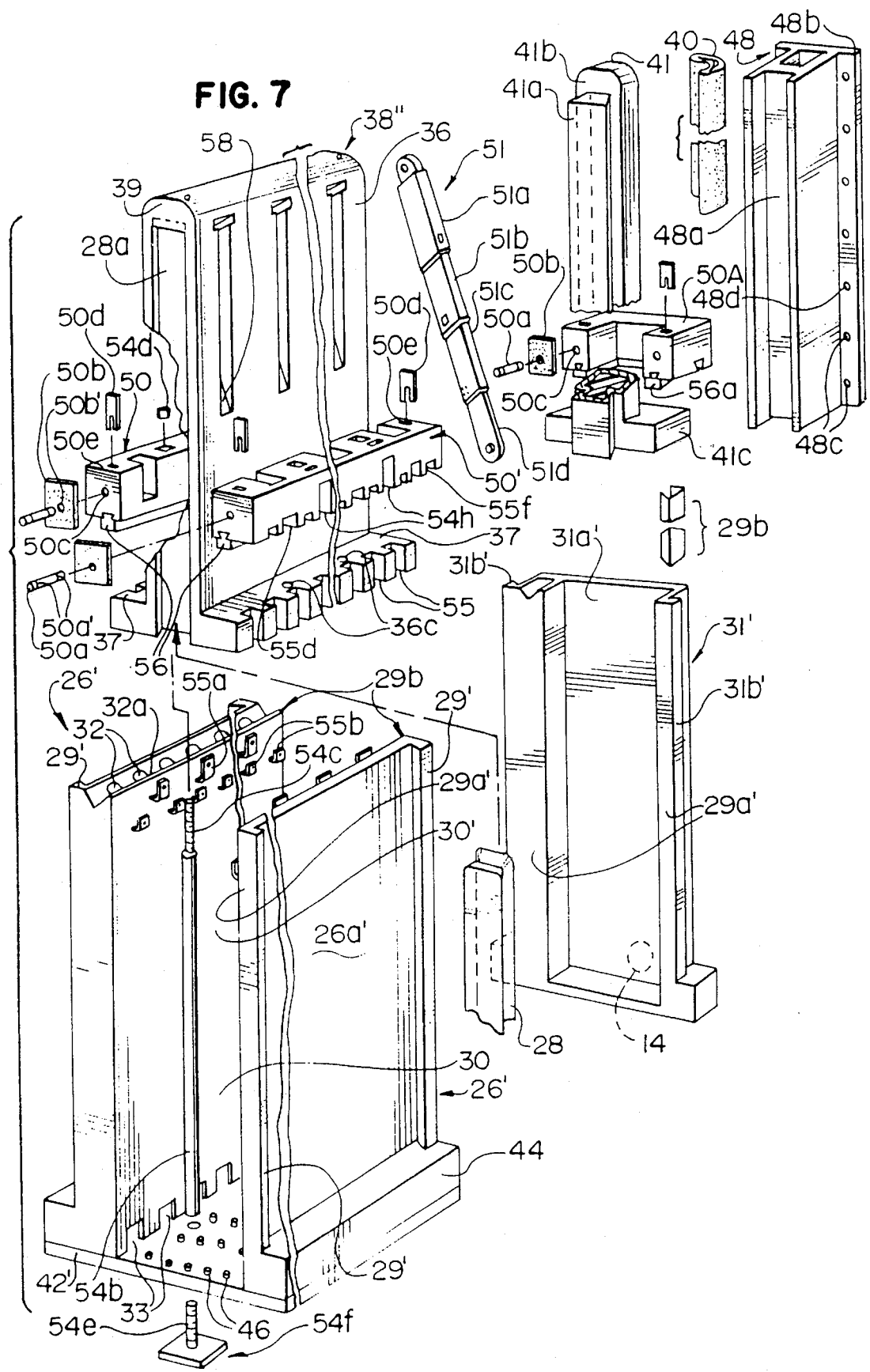

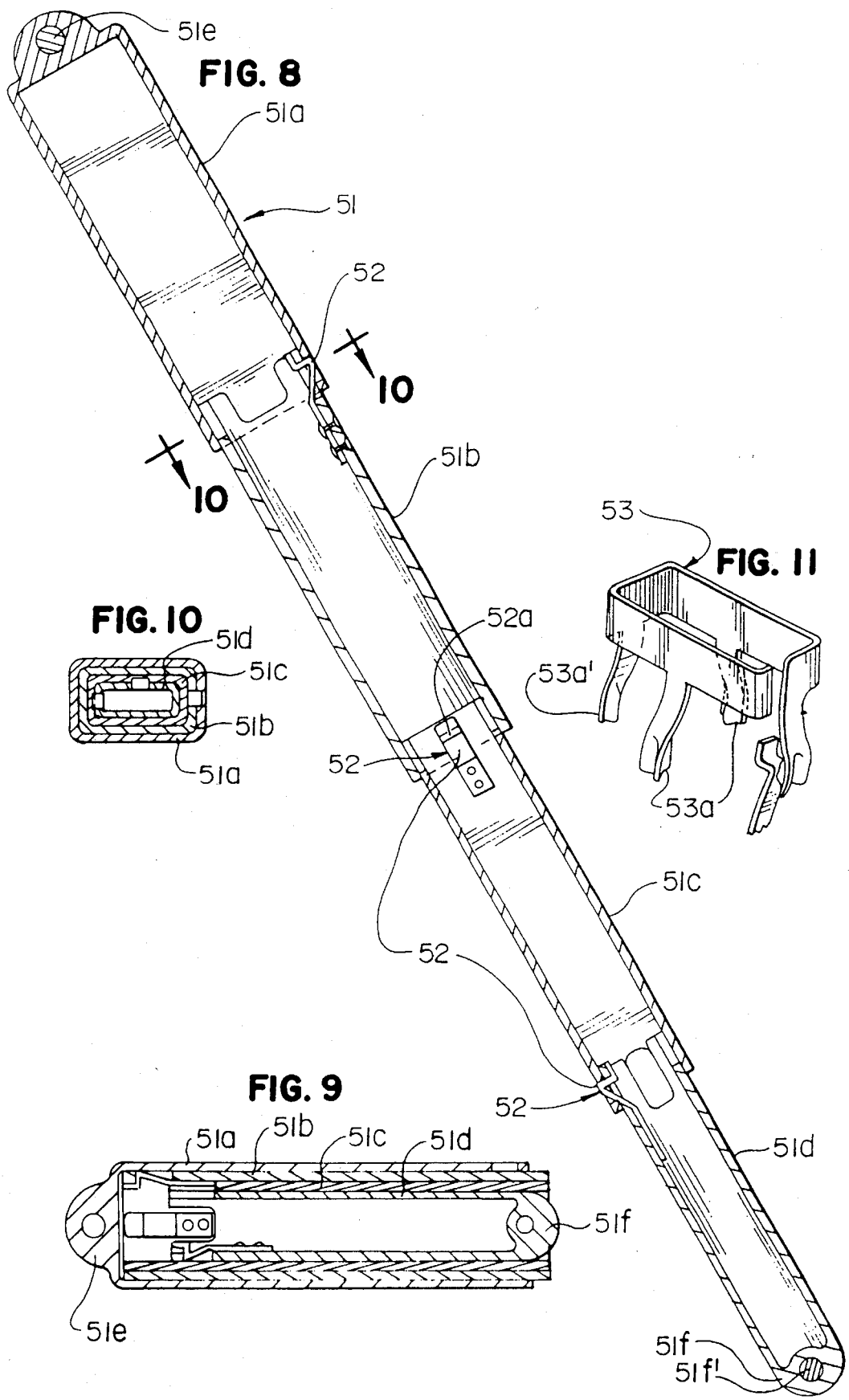

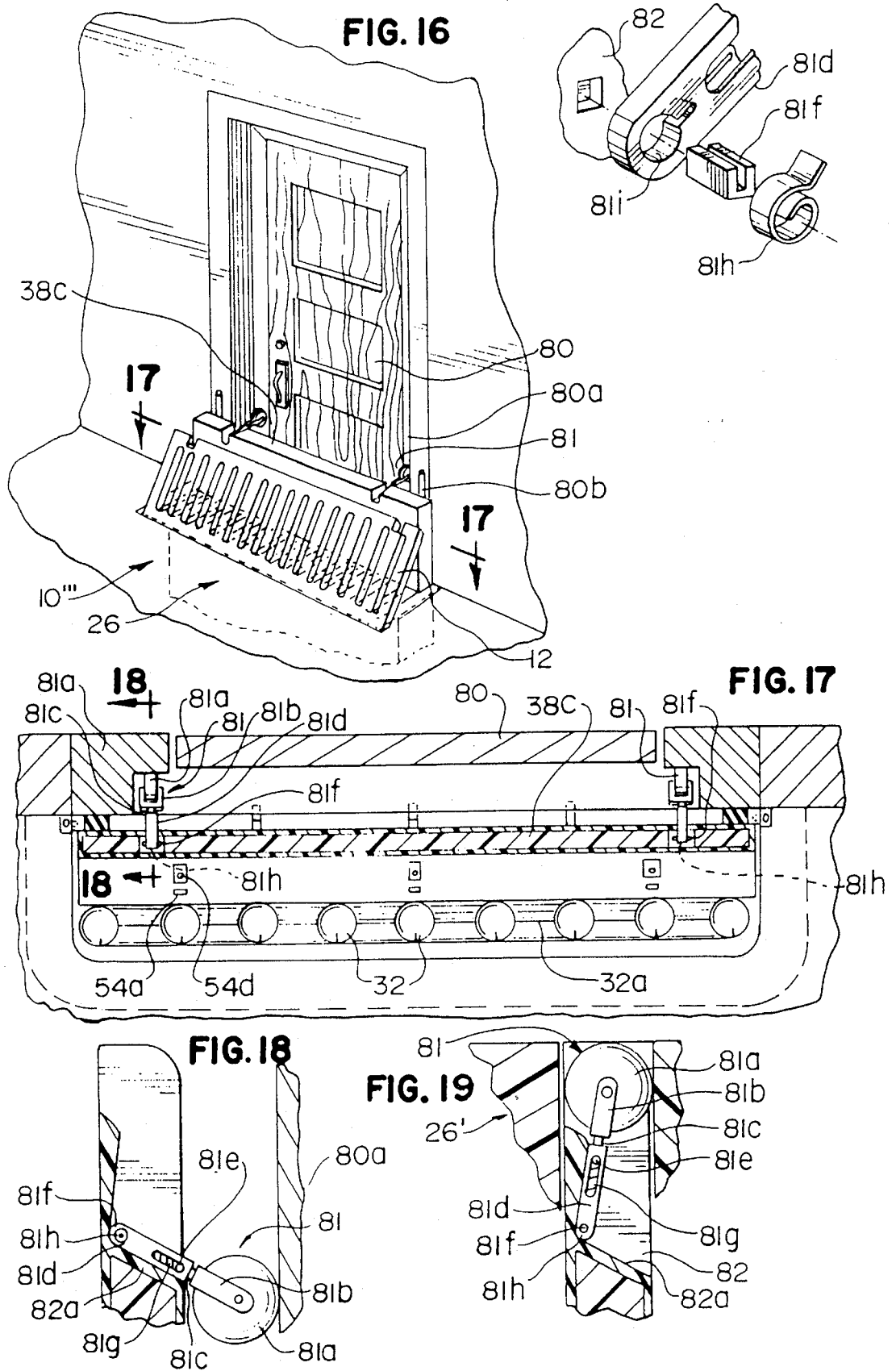

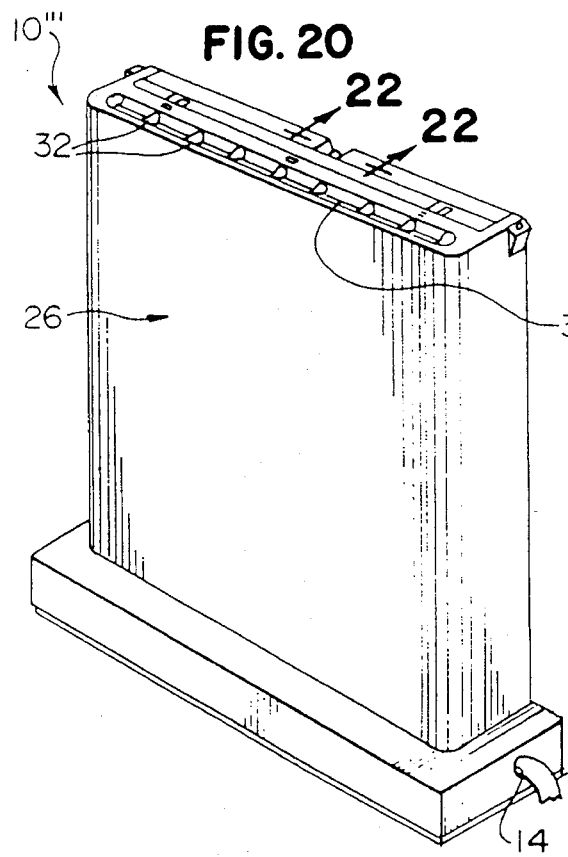
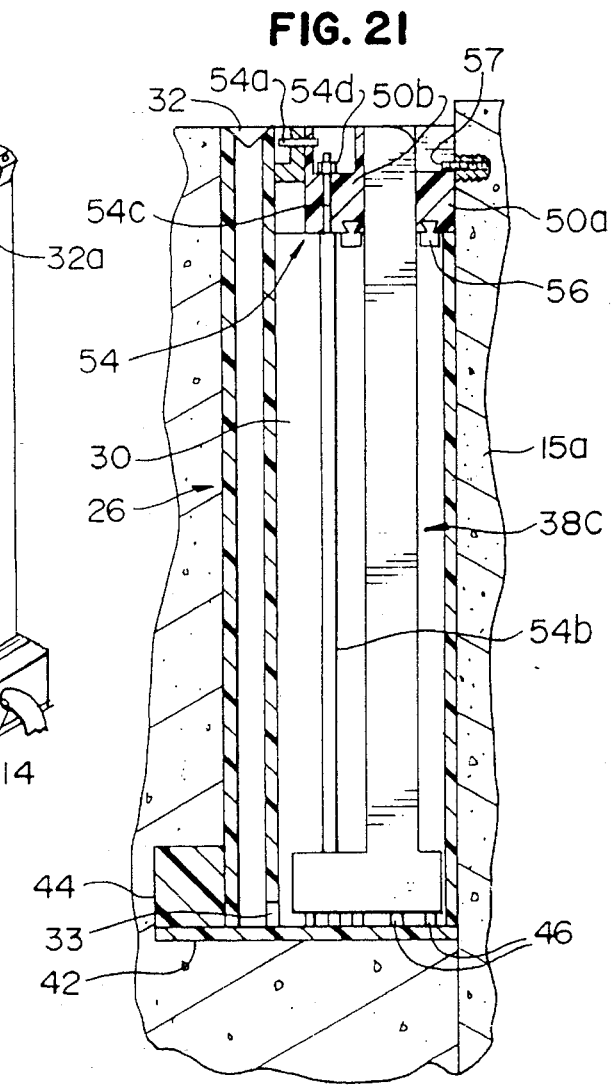
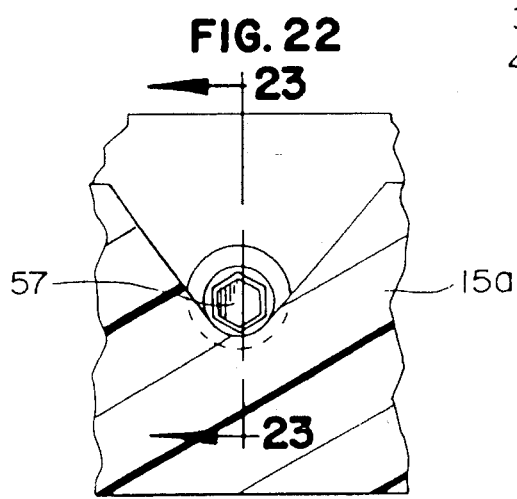
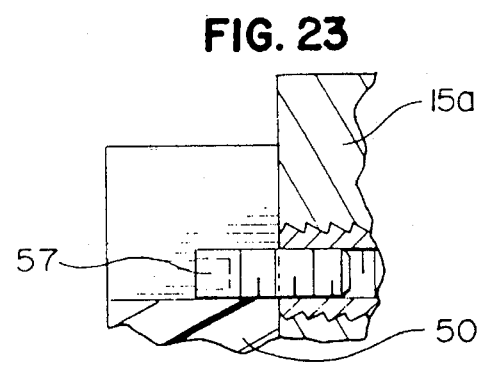

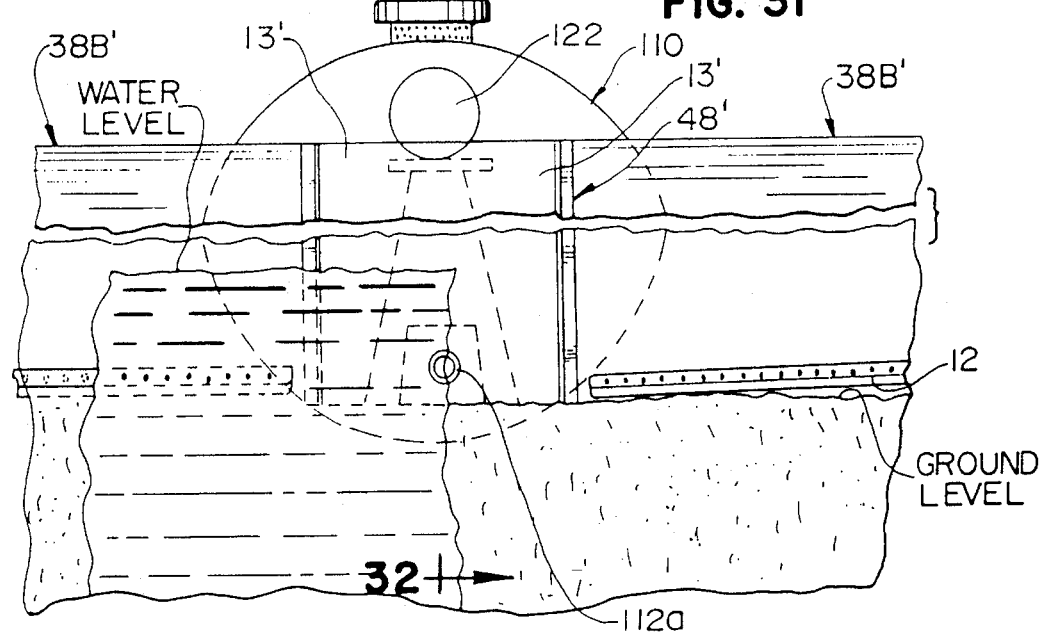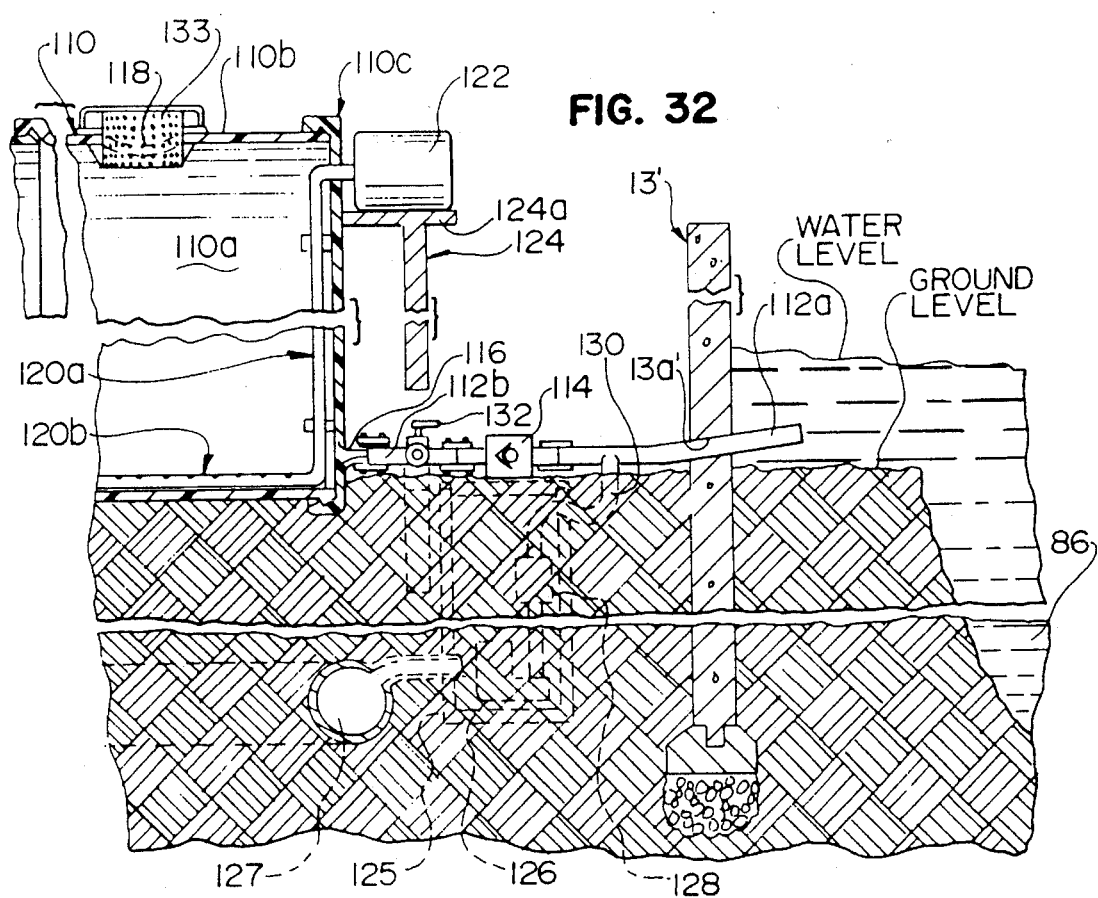

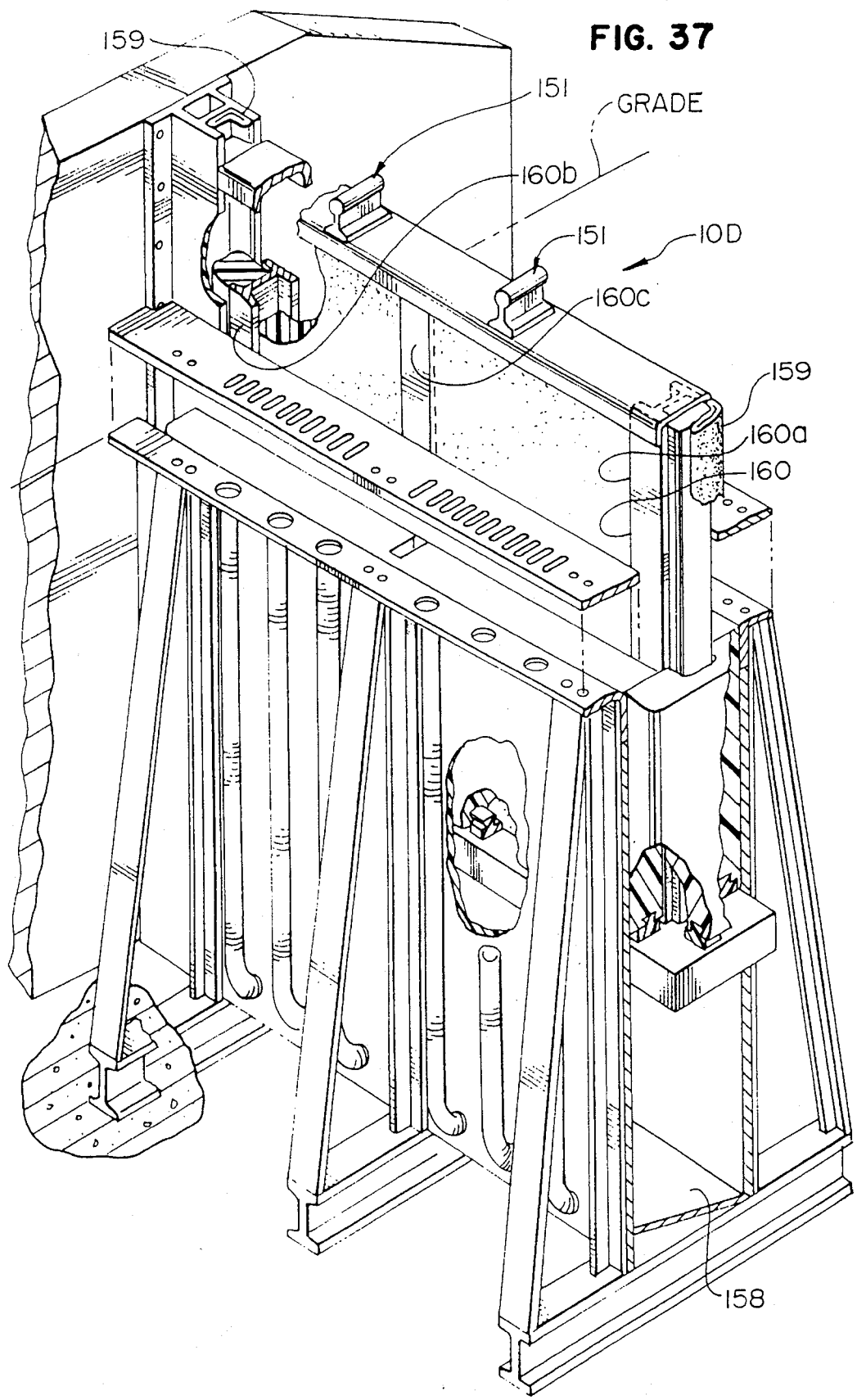

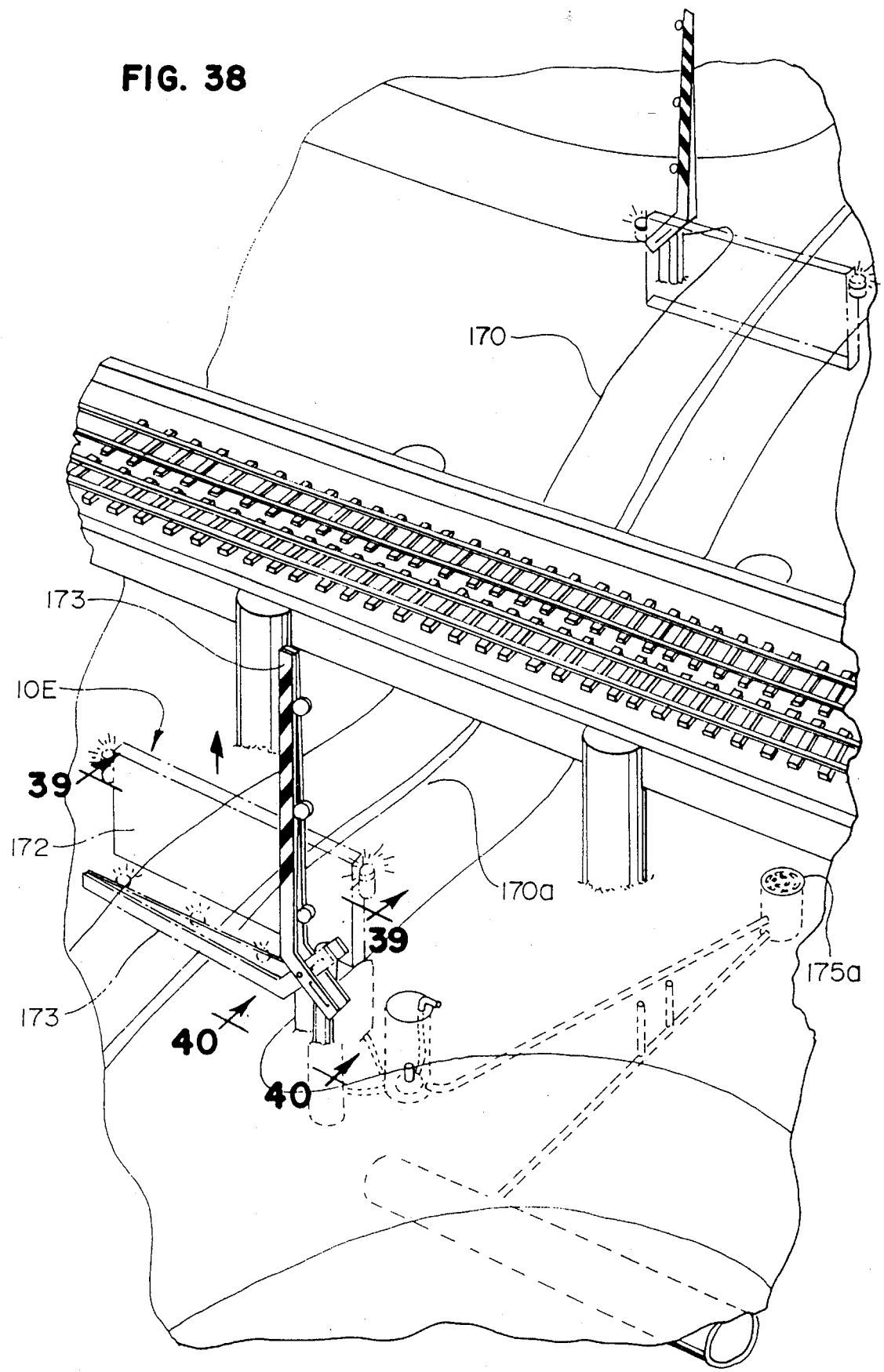

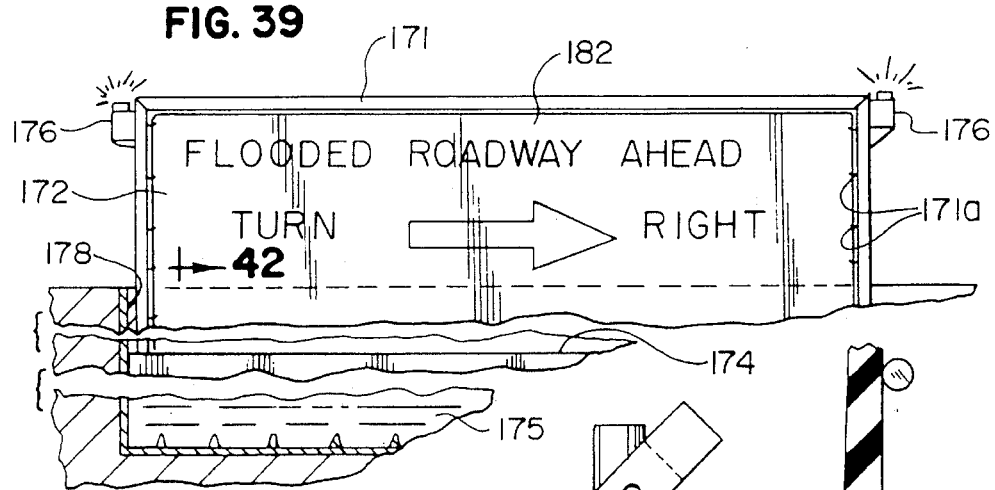
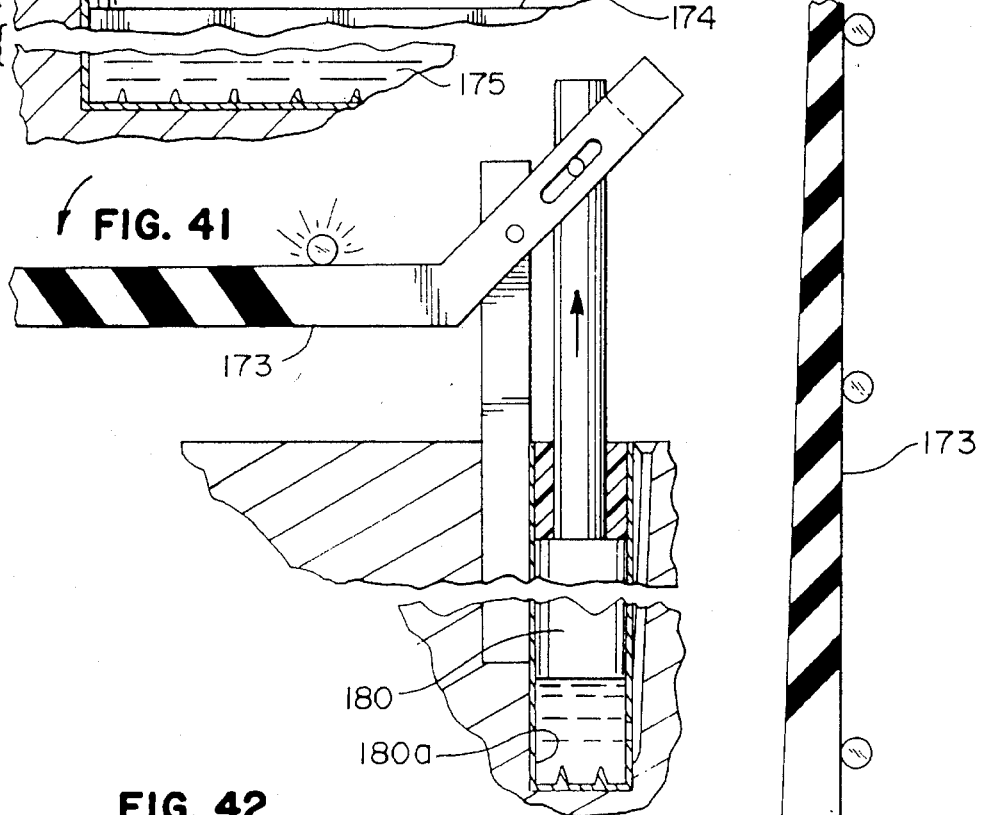
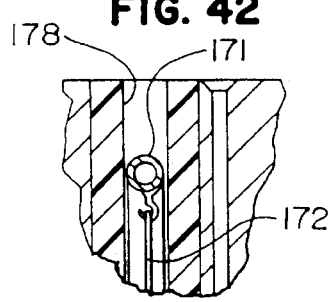
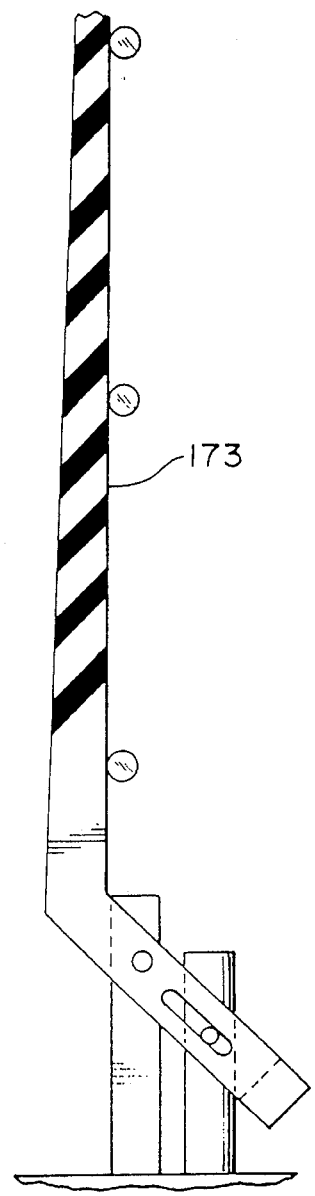

LIQUID AND FLOOD WATER BARRIER WALL FORMING-APPARATUS

This is a Continuation-in-Part of application Ser. No. 08/119,493, filed Sep. 9, 1993, now abandoned which is incorporated by reference herein.

FIELD OF THE INVENTION

This invention relates to a liquid barrier wall-forming system and apparatus therefor useful as a barrier for liquid containment, and especially for containment of flood water. In flood control applications, the present invention is particularly useful to form an automatic water barrier needing no energy to operate other than the force of the flood water to raise a water barrier wall. The barrier wall prevents an ingress of flood water in a variety of locations, such as a below grade level garage at the end of a downwardly sloping driveway, a doorway, a ground level window, into a yard or area surrounding a home, a home subdivision, or into a roadway near an overflowing river.

BACKGROUND OF THE INVENTION AND PRIOR ART

Various float-operated gates or barriers have been used to divert, contain or control the flow of liquids in a variety of situations, most quite different from those described above to which the present invention is particularly suitable. Controlling rising water, for example, especially under flood conditions, is particularly important in protecting property. One such device is described in U.S. Pat. No. 4,377,352, issued Mar. 22, 1983 to Goodstein, which describes a self-actuating water containment barrier. The barrier comprises a plurality of stanchions which are mounted for pivotal movement from a normal dormant horizontal position, to an active vertical position. The stanchions are interconnected with water barrier-forming sheeting to form a barrier which can conform to a particular land mass or shoreline. Float members are mounted on the bottom of the outer ends of the stanchions. At low water levels, the float members rest on a shallow body of water or on the ground in a near horizontal position. As the level of the water rises, the float members cause the stanchions to pivot into a vertical position, thereby raising the sheeting to form a water barrier. This water barrier float system is unsuitable for the above described application where cars or human beings must normally pass over the apparatus involved, or where it is desirable that the barrier wall rise into a protective full position before water builds up behind the wall, as in the applications described above. Also, because the float members are near the outer ends of the stanchions, any substantial turbulence in the water can cause the water to spill over the sheeting which terminates a short distance beyond the float members.

U.S. Pat. No. 3,176,469, issued Apr. 6, 1965 to Fowler, describes a control for automatic float-operated gates for protection against overflow conditions in reservoirs as found in dams or canals, applications very different from those above described. The gate control apparatus described in this patent is a masonry construction which houses a mechanism to control the raising and lowering of the gates. The gate control mechanism includes a float attached to a counterweight system attached to the gate over a pulley suspension. As the water level rises in a float well, the buoying up force of the float diminishes the effective weight of the counterweight. The gate opens as the counterweight lowers in its chamber. Likewise, as the water level diminishes, the opposite effect takes place and the weight of the gate acts to lower the gate.

U.S. Pat. No. 4,073,147, issued Feb. 14, 1978 to Nomura, describes a water gate control system for securing water for irrigation or industrial purposes. These are also applications very different from those to which the present invention is most useful. This patent describes the use of a hydraulic cylinder for controlling the swinging motion of the gate, the cylinder having a piston loaded so as to resist the hydraulic pressure acting on the gate. When the level of the water in the waterway is at a normal level, the hydraulic pressure exerted on the gate is lower than the resisting force of the spring in the hydraulic cylinder, so that the spring in the hydraulic cylinder forces the piston and hence the piston rod to extend upwardly holding the gate in an upright position. When the water level increases, the hydraulic pressure on the gate exceeds the resisting force of the spring forcing the piston rod against the spring thus opening the gate. This apparatus is completely impractical for the applications of the present invention described above.

The above patents describe water control systems particularly where large bodies of water are involved. As above indicated, none address the problems faced by both towns and individual homeowners who are often threatened by flood waters at various points about a house or other building, or around the perimeter of a given building subdivision. In addition, none of the above patents describes any type of liquid barrier apparatus which would be practical or useful in containing sudden, emergency spills, especially of hazardous liquids or chemicals. Thus, there remains a need for a liquid barrier system that responds immediately and automatically, without human assistance, and so responds to raise the barrier wall only when liquid, including flood waters, hazardous liquids or chemical spills, are of a volume which cannot be otherwise contained or drained away to avoid a flood or human hazard. In addition, there is a need for such a liquid barrier system that is useful for roadways threatened by flood water that is reliable, easy to use, install and reset to a below ground level position. The various aspects of the present invention collectively provide apparatus which when installed provides such an advantageous system.

SUMMARY OF THE INVENTION

Broadly, this invention provides a liquid barrier-forming system or apparatus comprising a housing structure buried below ground level and having a float-receiving chamber and at least one liquid inlet passageway extending from the top of the housing to the chamber. A float structure is located within the chamber. A barrier-forming wall, initially below ground level, is preferably an integral part of the float structure. The wall would then most desirably be the shell or housing for a body of float-forming material filling the housing. Less desirably, it could, however, be a separate pivotable support wall normally in a horizontal position initially below grade level, as is the float structure, and coupled by a linkage to the float structure. In either case, as the chamber fills with liquid, the float structure rises and its associated barrier-forming wall rises above ground level to form a liquid barrier.

The housing and float structures provide surfaces which mutually sealingly engage, preferably when the barrier-forming wall rises to its maximum height, so that a seal is provided under the buoyant forces applied by the water in the chamber on the float structure which prevents the water in the chamber from reaching ground level on the desired dry side of the barrier-forming wall. Support strut assemblies, which are also initially below ground level, are connected between the outer or upper portions of the barrier-forming wall and the housing structure. These strut assemblies are on the dry side of the barrier-forming wall and extend above ground level to a maximum length when the barrier-forming wall is moved to its uppermost position. These strut assemblies support the wall so that it can effectively hold back the pressure of any liquid body building up on the outer side of the barrier-forming wall.

In a preferred embodiment of the liquid barrier system of the present invention including the features described above where the liquid barrier apparatus is used for flood water control, the float-receiving chamber is provided with a outlet drain near the bottom of the housing structure so that under non-flood risk conditions the chamber will not fill with the liquid involved and the barrier wall will not rise. Under flood risk conditions, water will not be able to drain out of the housing structure fast enough to avoid build up of water in the chamber. The barrier-forming wall will then rise above ground level to stop flow of ground water to one side of the wall.

As previously indicated, the flood control applications of the present invention include use thereof in front of a doorway, window, across a sloping, below-ground extending driveway leading to a garage, across a highway cutting through a hillside, and surrounding a single house or other building, or an entire subdivision.

Another embodiment of the present invention, also including some of the features described above, is useful for containment of hazardous liquids, for example leaking from a ruptured storage tank. In this embodiment, the housing structure float chamber does not have an outlet drain, so that in the event of a spill, the chamber fills with liquid immediately, causing the barrier-forming wall immediately to rise. This feature allows for the immediate response necessary to contain hazardous liquids or chemicals in the event of a spill before the liquid has a chance to flow on the dry side of the barrier-forming wall possibly entering ground water source or causing other environmental problems.

In a preferred form of the invention where the barrier-forming wall and float structure are one integral structure, when the liquid builds up in the float chamber the upper portions of the structure move up through a narrow slot in the upper portion of the housing structure, to form a water liquid barrier which can extend as much as two or more feet above ground level when the barrier is to serve as a flood water barrier. In the case where the flood barrier system is in its dormant retracted position below a roadway where vehicles will pass over the apparatus, the float and barrier wall structure is isolated from the weight of these vehicles by an apertured grate located above this structure. The grate rests on the shoulders of a recess or well formed in the roadway. The center of gravity of the grate is to one side of the portion of the float and barrier wall structure which vertically rises above ground level, so that when the float and barrier wall structure rises above the level of the roadway, the top thereof will push the grate over to one side of the structure.

In another preferred embodiment of the present invention, the float and barrier wall structure normally can be positioned slightly below and between sections of a railroad track where the railroad track passes through a levee opening near a potentially flood-causing body of water. The top of the barrier wall carries a short track segment which would normally bridge the track sections on opposite sides of the levee. The track segment would be located slightly below the level of the remaining track sections so that the track segment is engaged only on a lateral side by the flanged portion of a train wheel. This small, slightly depressed segment of track maintains the lateral alignment of the train while protecting the barrier wall apparatus from the full weight of a passing train. As flood conditions cause the flood barrier wall to rise, the segment of track carried on the wall rises above ground level with the wall which seals against the spaced sides of the levee to prevent flood water from reaching the desired dry side of the levee. As flood conditions subside and the flood barrier apparatus lowers, the segment of track is restored to its original position and train traffic can continue as normal.

In a related and alternative embodiment, an alternative barrier wall system is not used to seal an area. Rather, it is used to block a section of a highway or other roadway when there is a risk of underpass flooding or other flooding ahead of the point where the barrier wall is located. This particular barrier wall system can be positioned at the entrance of an underpass on a highway, or before a spillway area near a highway, as typically seen in the Southwestern states. During flooding conditions, underpasses to highways are usually the first areas to accumulate large amounts of water, often deeper than many motorists realize. As a result, many cars become trapped in these underpasses during flood conditions. Similarly, spillway areas often experience flash flooding which can flood nearby highways. Positioning the structure before an underpass or spillway area where it would rise during flood conditions, would block the entrance to the underpass or highway preventing cars from becoming trapped. Most preferably, the barrier wall structure would be located near an exit ramp nearest the underpass, so that motorists would have an opportunity to exit the highway before reaching the flooded area. In this embodiment, the portion of the barrier wall to rise above ground may include a tubular outer frame supporting a solid sheet or woven structure which is flexible, and optionally, coated with a head light reflective material forming a warning sign. The barrier wall would rise through the aid of a float structure contained in a float chamber, as described in earlier embodiments, as the chamber slowly fills with water due to sewer back-up at the underpass location or other flood risk area.

Preferably, the barrier wall system would also include a separate, weighted, cantilevered, pivotally mounted, normally upright gate which is lowered in front of the slower rising flexible barrier wall. The gate serves as an additional immediate barrier and warning to motorists. The gate resembles those used at railroad crossings, but is float operated. The gate is thus lowered by a separate, rising float structure in a separate float chamber which rapidly fills with water under flood risk conditions. The rising float structure operates a linkage which quickly pivots the gate into a horizontal position before the other barrier wall rises above ground level. The gate alone is not used because it can be easily broken by impatient motorists. The more effective barrier wall which is always supported below ground over the full width of the roadway, is a more effective backup barrier wall except for its slow rising time. Both the gate and the underground supported barrier wall include a set of flashing lights, operating on a solar-charged battery system. The flashing lights would rise above ground level and be activated by a switch as the associated float structures rise to the top of their float chambers.

Other features of the invention include details of the float and housing structures which foster ease of assembly and dis-assembly, the manner in which the liquid tight seals are obtained, the design of the support strut assemblies, and the use of storage tanks and one-way valves to collect flood water for later use for irrigation and other purposes.

BRIEF DESCRIPTION OF THE DRAWINGS

FIG. 3 is a vertical transverse sectional view of the housing, float and barrier wall structures shown in FIG. 1;

FIG. 4 is a vertical transverse section view of the housing, float and barrier all structures shown in FIG. 2;

FIG 4A is a fragmentary sectional view through a portion of the housing structure showing how this structure backs up the bottom of a support strut assembly of the combined float and barrier wall structure;

FIG. 5 is a top plan view of the barrier wall-forming apparatus as it appears in its lowered position, showing the water inlet passageways, the support strut assemblies and the guide rod and bolt assemblies;

FIG. 6 is an enlarged, fragmentary side view of the barrier wall structure showing the support strut assembly receiving slots;

FIG. 7 is a view showing the main parts of the barrier wall-forming apparatus, in particular, the housing structure module, the float and barrier wall structure, the support strut assembly, the outer float and barrier wall structure seal-forming end cap and the housing structure outer end cap;

FIG. 8 is an enlarged view of one embodiment of the support strut assembly shown as a telescoping strut assembly in its full extended position;

FIG. 9 is a top view of the support strut assembly shown FIG. 8, in a collapsed position;

FIG. 10 is a cross sectional view of the collapsed support strut assembly shown in FIG. 9;

FIG. 11 shows a tool useful in releasing the locks on the support strut assembly to lower the float and barrier wall structure;

FIG. 16 shows another embodiment of the barrier wall-forming apparatus for use in front of doorways under flood conditions;

FIG. 17 shows a top view of the barrier-forming apparatus illustrated in FIG. 14;

FIG. 18 shows an enlarged perspective view of the spring-loaded guide wheels used to guide the float and barrier wall structure illustrated in FIG. 16;

FIG. 18A is an enlarged exploded perspective view of a portion of FIG. 18.

FIG. 19 is a view corresponding to FIG. 18 showing the guide wheel in its collapsed position within the barrier wall structure of FIG. 16;

FIG. 20 is a perspective view of the barrier wall-forming apparatus of FIG. 16, before being anchored in concrete below ground, and showing the float and barrier wall structure in its lowered, recessed position;

FIG. 21 is a vertical transverse sectional view of the barrier wall-forming apparatus illustrated in FIG. 20, after it is mounted in concrete and showing the inner chamber of the housing structure and the float and barrier,wall structure thereof;

FIG. 22 is a fragmentary sectional view showing one of the anchor pins which aid in holding the head block of the housing structure in place;

FIG. 23 is a sectional view through FIG. 22, taken along viewing plane 23—23 therein;

FIG. 31 is an end view of the one of storage tanks and the related barrier wall-forming apparatus shown in FIG. 20 under flood conditions and as seen from the river side of the barrier wall;

FIG. 32 is a longitudinal sectional view through FIG. 30, taken along viewing plane 32—32 therein;

FIG. 37 is a sectional view of the barrier forming apparatus shown in FIG. 35 showing the elevated float and barrier wall with the I-beam support structure.

FIG. 38 is still another alternate embodiment of the barrier wall-forming apparatus of the invention showing the barrier wall positioned at the entrance to an underpass on a highway.

FIG. 39 is a front view of the flexible barrier wall as it would appear in its elevated position and showing the warning sign incorporated therein.

FIG. 40 is a front view of the gate in an upright position.

FIG. 41 is a front view of the gate in its fully lowered position as it would appear in front of the flexible barrier wall and the float structure contained within a chamber which is used to lower the gate into a horizontal position.

FIG. 42 is a sectional view of the lowered flexible barrier wall positioned within the slot.

DESCRIPTION OF EXEMPLARY FORMS OF THE INVENTION

FIGS. 1–13 Embodiments

Figure 1:
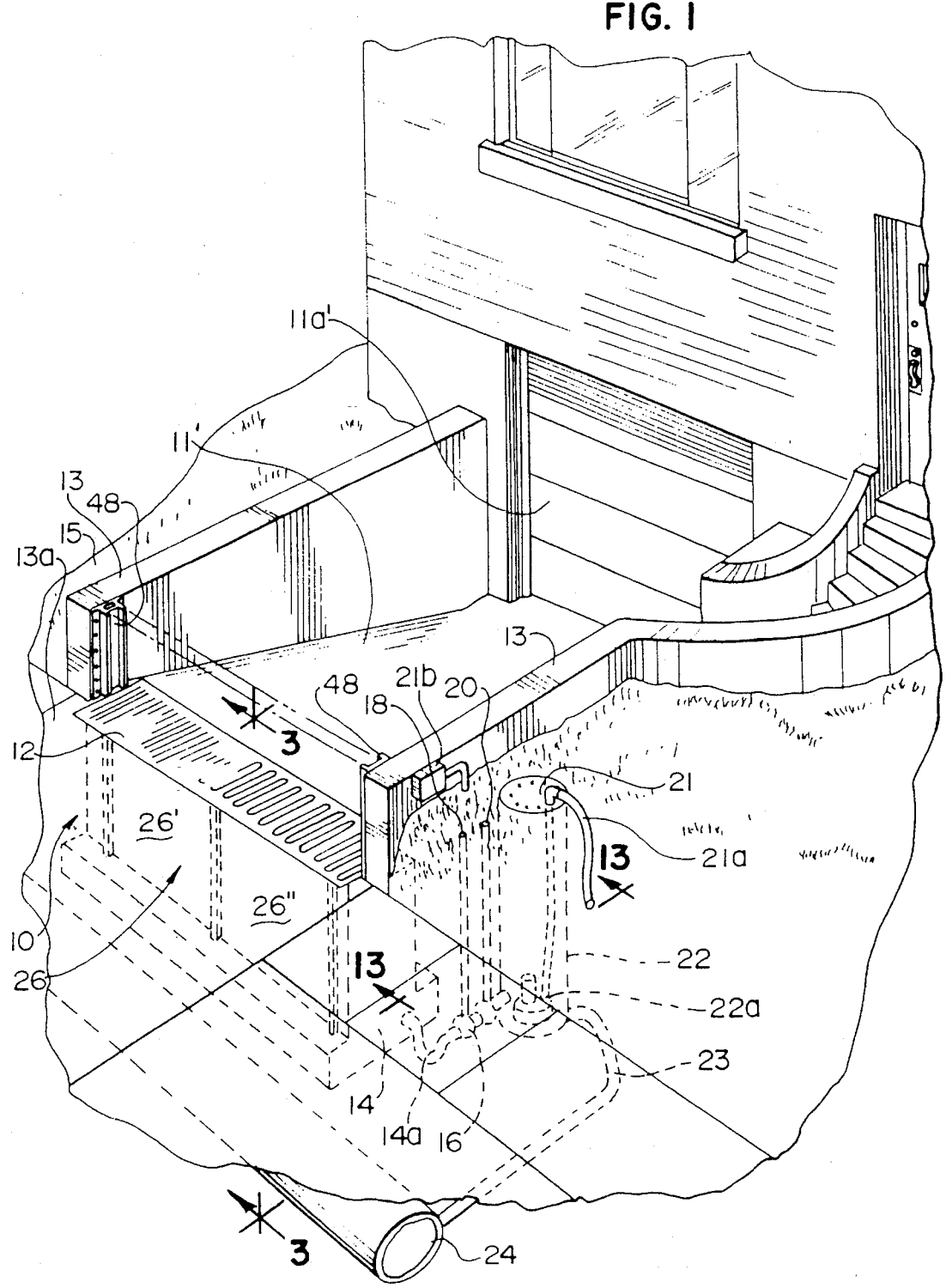
FIG. 1 is a perspective view of one embodiment of the invention showing liquid barrier wall-forming apparatus installed in the ground located at the top of a downward sloping driveway and ending in a below grade level garage, with connections to a sump pump and a sewer system.
Figure 2B:
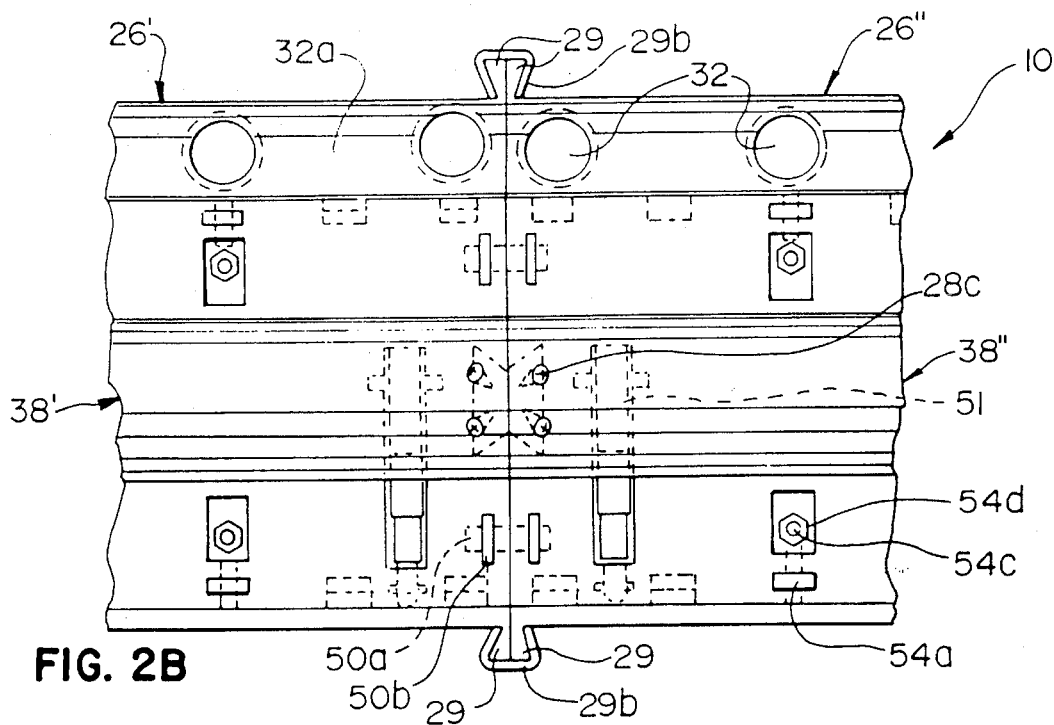
FIG. 2B is a fragmentary sectional view through the juncture points of adjacent modules of the float and barrier wall structure shown in FIG. 2, as seen along horizon viewing plane 2B—2B therein.
Figure 2C:
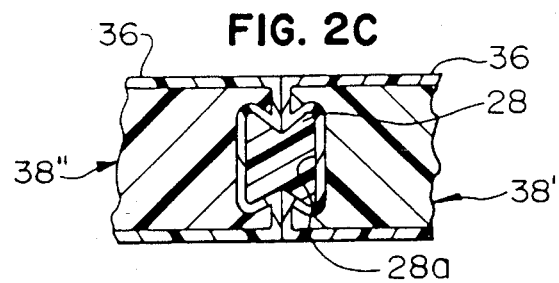
FIG. 2 is a perspective view, partly in section, of the liquid barrier wall-forming apparatus showing a housing structure thereof below ground and a combined float and barrier wall structure in its full upward extended position as it would be under flood risk conditions.
FIG. 2A is an enlarged, fragmentary perspective view of a plug which could be used to seal the water inlet passageways of the housing structure.
FIG. 2O is a fragmentary sectional view through the juncture points of adjacent modules of the float and barrier wall structure shown in FIG. 2, as seen along horizontal viewing plane 2C—2C therein.
FIG. 2D is a fragmentary sectional view through the juncture points of adjacent modules of the float and barrier wall structure shown in FIG. 2, as seen along vertical viewing plane 2D—2D therein.
FIG. 2E is a fragmentary enlarged vertical sectional view through the housing structure shown in FIG. 5, showing how the head blocks of that structure are supported on fingers projecting in one plane from the main body portion thereof, as seen in a vertical viewing plane 2E—2E shown therein.
FIG. 2F is a fragmentary enlarged vertical sectional view through the housing structure shown in FIG. 5, showing how the head blocks of that structure are supported on other fingers projecting in another plane from the main body portion thereof, as seen in a vertical viewing plane 2F—2F shown therein.
Figure 2D:
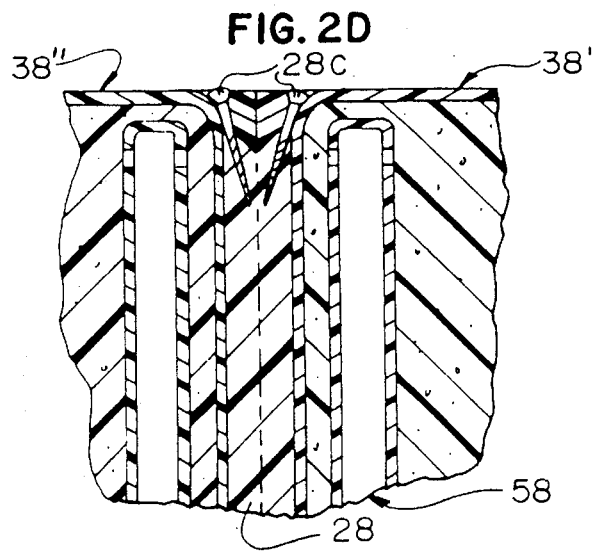

Referring first to FIGS. 1–4, there is shown a flood water barrier system, generally indicated by reference numeral 10. The flood water barrier system 10 comprises a housing structure 26 preferably including two housing structure modules 26' and 26" that are connected together to span the full width of a driveway 11. The inside of the housing structure 26 defines a float receiving chamber 30 (FIG. 5) formed between longitudinal side walls of the two housing structure modules. FIG. 7 shows the chamber portion 30' formed by one of the modules 26' and FIG. 4 shows the chamber portion 30" formed by the other module 26'. The top of the housing structure 26 has V-shaped channel 32a(FIGS. 2–5) running the full length thereof. Within that channel 32a are several vertical inlet passageways 32 which communicate through inlet orifices 33 (FIGS. 3–4) at the bottom of the housing structure 26 with the bottom of the float-receiving chamber. Projecting upwardly from the bottom of the chamber are a plurality of upstanding spacer pins 46 (FIG. 3). The float-receiving chamber houses a float and barrier wall structure 38 formed by a pair of secured together modules 38' and 38"(FIG. 2) which are normally retracted below ground level, resting on the spacer pins 46. A water inlet grate 12 flush with ground level covers the top of the housing structure 26. Under flood conditions, the float-receiving chamber fills with water, causing the float and barrier wall structure 38 to move vertically in an upward direction, shifting the grate 12, whose center of gravity is to one side of the upper portion of the float and barrier wall structure 38, upward and off to one side thereof. The float and barrier wall structure 38 is held in position against the force of the rising water by a series of support strut assemblies 51. All of these structures, the manner in which the water-tight seals are formed and a variety of optional support strut assembly designs, are described in more detail below.

In the embodiment of the invention shown in FIGS. 1–13, the flood water barrier system 10 is placed at a point along the downward sloping driveway 11 (FIG. 1) leading to a below grade garage 11a where rain water cannot normally spill over walls 13 at the sides of the driveway 11. As shown in FIG. 1, this point is at the top of the driveway 11, where the soil 15 is shown rising abruptly from ground level which is shown as a sidewalk 13a. The flood water barrier system 10 prevents flood waters from reaching the garage 11a at the bottom of the driveway 11.

The bottom of the float-receiving chamber 30 has a drain aperture 14 at the end of housing structure module 26" (FIG. 2) which is connected by a pipe section 14a (FIG. 1) to a normally open closure valve 16 located at the bottom of a vertical valve tool-receiving tube 18. The on-off handle (not shown) of the valve 16 is accessible to a tool insertable down into the tube 18 to move the handle to a fixed open or closed position. It is normally in an open position. A vertical flush water-receiving tube 20 also communicates with the pipe section 14a so that flush water can be forced down into the tube 20 to loosen and flush away soil and other debris which may gain access to the pipe section 14a and float-receiving chamber bottom. The tops of the tubes 18 and 20 are normally closed by removable caps.

The pipe section 14a is also connected to a vertical sump pump-containing chamber 22 closed by a cover 21. A drain tube 21a leads from the outlet of the sump pump 22a to the surface of the ground. The chamber 22 is shown connected by a pipe section 23 to a storm sewer 24. This drain system drains water out of the float-receiving chamber of the system 10 so that the float and barrier wall structure 38 remains below ground except under flood risk conditions when the storm sewer backs up or the rate at which water flows into the inlet passageways 32 is greater than can be carried away by the drain system.

The sump pump 22a is turned on and off by the homeowner by a switch in a switch box 21b conveniently located.

In FIG. 1, the switch box is shown mounted on the side of one of the driveway side walls 13. The sump pump 22a is turned on when flood conditions subside and the water in the float-receiving chamber 30 fails to drain into the storm sewer because of a blockage in the pipe section 23 or for other reasons.

Figure 12:
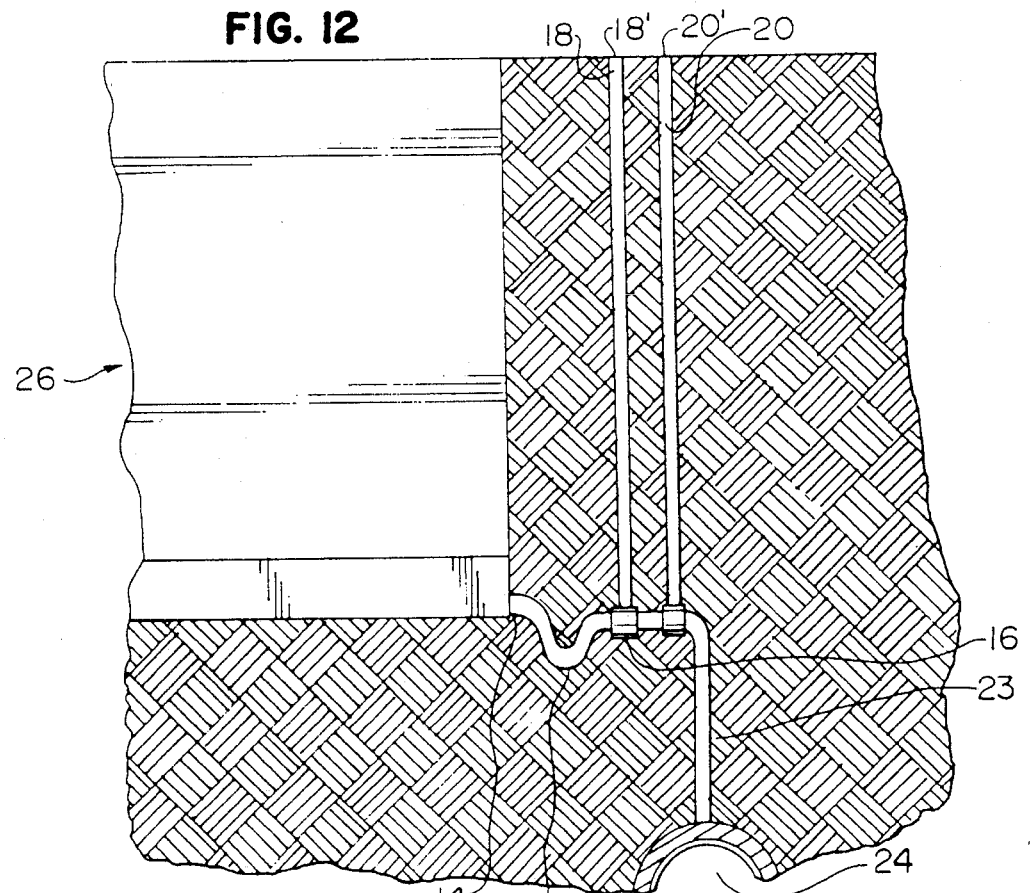
FIG. 12 is a below ground level vertical sectional view of a barrier wall-forming apparatus like that shown in FIG. 1 but showing a modified drain system for the apparatus connected directly to the sewer system.
Figure 13:
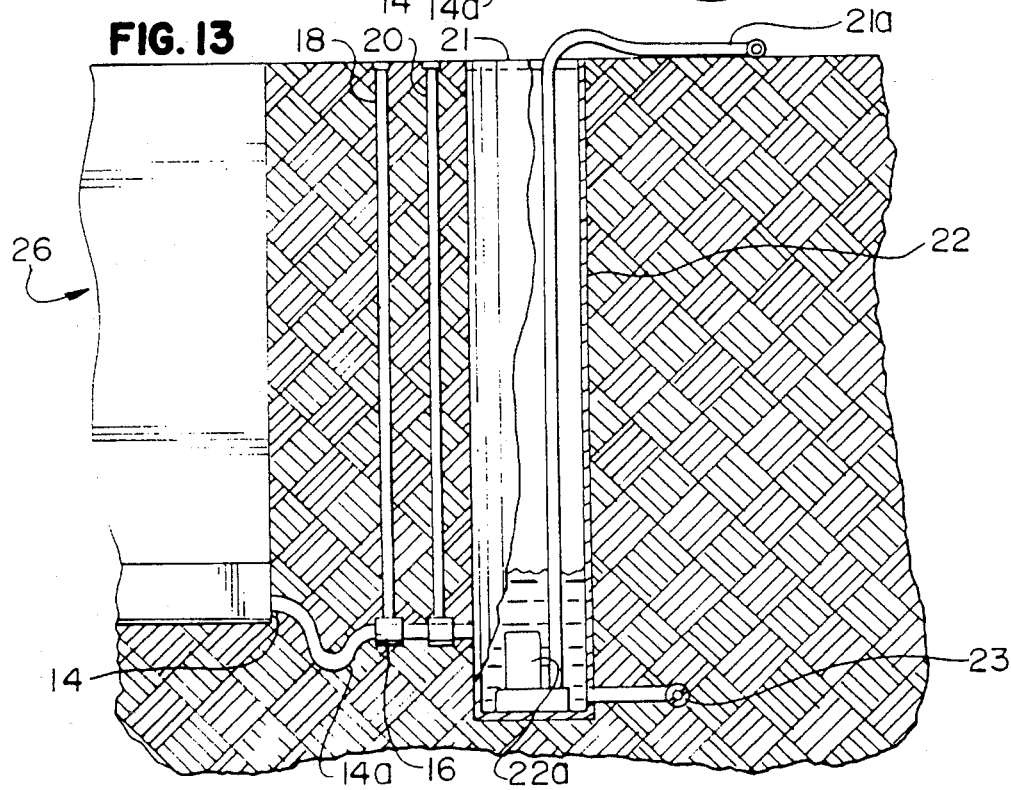
FIG. 13 is a below ground level vertical sectional view of the barrier wall-forming apparatus of FIG. 1, as seen along viewing plane 13—13, and showing the drain system used therein.

In a second drain system embodiment shown in FIG. 12, no sump pump is provided, so that the pipe section 14a is connected directly by the pipe section 23 to the storm sewer 24.

Referring now to FIGS. 2, 3 and 7, there is shown perspective views in partial section of the flood water barrier system 10 with the float and barrier wall structure 38 in its fully extended upright position as it would be under flood risk conditions. Each housing module 26' and 26" includes a main body portion 26a' or 26a" which is an integrally molded piece having longitudinal walls 29b'—29b' or 29b"—29b" defining therebetween a float receiving chamber 30' or 30". This chamber 30' or 30" opens onto the top and longitudinal sides of the main body portion 26a' or 26a" of each of the housing modules. The longitudinal side walls of each housing module terminate at the opposite longitudinal sides of each body portion in vertical flanges 33'—33' and 33"—33".

The housing modules 26' and 26" are connected together by a water-proof adhesive applied to the confronting end faces 29a"-29a'(FIGS. 2C and 7) of the flanges 33' and 33" of the modules 26' and 26". Preferably, to further reinforce the connection or hold the modules together, clips 33b (FIG. 2) are slid over the confronting flanges of the adjacent modules to clamp the adjacent modules together.

As best seen in FIGS. 2 and 7, an end cap 31' having a main vertical wall 31a' terminating in flanges 31b'—31c'(FIG. 7) covers the outer end of the housing module 26'. A similar end cap 31" (FIG. 2) terminating in flanges 31b" covers the outer end of the other housing module 26". The end cap 31" has a main vertical wall 31a" with a cutout (FIG. 2) forming the drain opening 14. The end caps 31' and 31" are attached by applying a water-proof adhesive to the adjacent flange pairs 31b"–33" and 31b"–33' and adjacent confronting end faces 29a'—29a' and 29a"—29a" of the housing modules 26' and 26". Again, for additional reinforcement, end clips 33b are positioned over the flange pairs 31b–33' and 31b–33" of the housing modules 26' and 26". The housing structure 26 can be constructed from fiberglass, any type of corrosion-treated metal, or preferably, prepared from any suitable synthetic plastic material such as polypropylene, polystyrene or more preferably, PVC.

Each of the modules 26' and 26" has a bottom closure plate 42' or 42" closing off the bottom of the float-receiving chamber 30 of the corresponding module. The bottom plates 42' and 42" projects beyond the longitudinal side walls of the main body portion of the associated housing module to form flanges upon which are adhesively secured flange-forming bars 44' and 44". These flange-forming bars 44' and 44" form a base or seat for the housing structure involved which is embedded in a body of concrete 15 best shown in FIG. 2.

As previously indicated, the grate 12 covers the top of the housing structure 26 and the float and barrier wall structure 38 when it is below ground. The grate 12 is typically situated in a grate receiving recess 17 (FIG. 3) where it rests on a grate support shoulder 19 formed in the concrete 15 so that when the flood water barrier system 10 is below ground, it is protected from the weight of automobile or human traffic passing over it. When the float and barrier wall structure 38 rises, the grate 12 is thereby off to one side where it is shown supported at an angle up against the float and barrier wall structure 38 in FIG. 4.

It may be desirable to render the entire flood water barrier system of the invention inoperable during normal weather conditions when there is no flood expected. This is because it is desirable to prevent the flow of dirt and the like into the inlet passageways 32 which can clog up the system when dirt and other debris collect in the bottom of the float-receiving chamber 30. To this end, an optional plug 31, shown in FIG. 2A, is provided which can be used to seal the top of each inlet passageway 32, thus preventing dirt and debris or liquid from entering the associated inlet passageway 32 and eventually, the chamber 30' or 30". The plug 31 can be constructed from any suitable compressible material and preferably includes a tapered body 31b of compressible rubber material filling the space between top and bottom plates 31a. The assembly of the plates 31a and compressible body 31d is held together by a nut 31c securing a bolt 31d which runs the entire length of the plug 31.

As disclosed in FIGS. 3 and 4, the float-receiving chamber defined jointly by the communicating chambers 30' and 30" of the housing modules 26' and 26" contains a float and barrier wall structure 38 preferably made by separate secured together float and barrier wall modules 38' and 38". Preferably, the barrier-forming wall portion 36 of each module 38' or 38" is a shell or hollow housing filled with a body of float-forming material. The shell portion 36 of each module includes a flange-forming bottom portion 36a (FIG. 3) and a narrow vertical upper main body portion 36b. The unitary float and barrier wall structure 38 formed by the modules 38' and 38" is guided for vertical movement by guide rod-forming portions 54b of anchoring bolts, to be described, passing through apertures 36a' in the flanged portion 36a of the structure 38. Less desirably, the barrier-forming wall could be a separate pivotable structure, normally in a horizontal position, which is coupled by a linkage to the float structure. In either embodiment, the float structure 34 comprises a light-weight, buoyant material, such as a polystyrene foam material. The shell 36 of each module 38' or 38" is preferably made from a synthetic plastic material like PVC. The float and barrier wall structure can be designed to range in height, for example, from 30 inches to 46 inches, or custom designed for a variety of heights depending on the flood risk conditions of a particular area.

The float and barrier wall structure modules 38' and 38" are connected together using a dovetail key 28 (FIGS. 2C and 7) placed between the modules 38' and 38" in a correspondingly shaped slot 28a (FIG. 7) formed by the confronting vertical margins of the modules 38' and 38". The key 28 is shown anchored in place by screws 28l in FIGS. 2B and 2D. The ends of the modules 38' and 38" are fitted with outer-seal forming caps 41, which assist in forming a water-tight seal around the apparatus, as will be described in more detail later. The modules 38' and 38" can also be secured by applying a water-proof adhesive to the confronting end faces 39 thereof (FIG. 7). In the initial assembly of the various modules used with a barrier wall system, the key 28 which secures together adjacent float and barrier wall modules can be raised into position in the keyway, it may be desirable to lock the key an uppermost position. This is done by screws 28c which are screwed through the shell of the float and barrier walls modules and into the key 28.

As illustrated in FIG. 4 and in more detail in FIGS. 8–10, when the float and barrier wall structure is above ground, it is held and supported in its upright position against the force of rising water by a series of telescoping support strut assemblies 51. When the float and barrier wall structure rises, the support struts 51 telescope out to their full length into a series of graduated sections 51*a*, 51*b*, 51*c*, 51*d* (FIG. 8). Each section has a spring-loaded lock 52 which locks it into position providing sufficient strength to the float and barrier wall structure 38 under flood or spill conditions. Each lock includes a spring detent 52 secured to the inner surface of the upper end portion of each of the support strut sections 51*b*, 51*c* and 51*d*. Each spring detent has a pointed portion 52*a* projecting through an aperture in a bottom portion of the support strut section 51*a*, 51*b* or 51*c*. When the float and barrier wall structure 38 is in its extended position, each support strut assembly 51 rests against a supporting wall 58 (FIG. 4A) formed by the vertical upper main body portion 36*b* of the float and barrier wall structure 36 and a wall 58' (FIG. 4A) formed in a head block 50' forming part of the housing structure 26. Each support strut assembly 51 is pivotally attached at one end 51*e* to the top of the float and barrier wall structure, and at the other end 51*f* to the top inside of the housing structure 26, as best seen in FIG. 4. When the float and barrier wall structure is recessed below ground, the support strut sections 51*a*, 51*b*, 51*c*, 51*d* collapse one inside the other (FIG. 9). A tool 53 with spring-releasing fingers 53*b* is provided, as shown in FIG. 11, which fits over the individual sections 51*a*, 51*b*, 51*c*, 51*d* of the extended support strut 51 to assist in pressing the projecting portion 52*a* of each section inward so as to unlock each section one at a time so that the float and barrier wall structure 38 can be lowered.

An important aspect of the present invention is that the float and barrier wall structure forms a water tight seal with the housing structure 26, thus preventing any water from passing around the float and barrier wall structure 38. An effective water tight seal results from an upwardly facing surface 37 on the flanged portion 36*a* of each module of the float and barrier wall structure being forced by the upward buoyancy forces of the water into sealing contact with downwardly facing surfaces on a head block 50 or 50' removably attached to each side of each module 26' and 26" of the housing structure 26. Compressible seal-forming strips or gaskets 56 (FIG. 7) are secured to these downwardly facing surfaces of the head blocks 50.

Each head block 50 and 50' of each module 38' and 38" is located in the upper portion of the housing structure 26 and supported upon barrier and upper series of L-shaped supporting fingers 55*a* and 55*b* which extend outwardly from the inside surface of the housing structure 26 at the upper extremity of the float-receiving chambers 30' and 30" of the modules 38' and 38" (see FIGS. 2E, 2F, 3, 4 and 7). The lower series of fingers 55*b* extend up into vertical apertures 55*c* (FIG. 2E) in the head block. The lower series of fingers 55*a* extend up into vertical apertures 55*e* (FIG. 2F) in the head blocks. Clearances 55*d* and 55*f* are provided in the head blocks to enable them to be moved down upon these fingers.

The head blocks 50 and 50' are further held in place by groups of guide rod and head block anchoring bolt assemblies. Each anchoring bolt assembly includes an anchor bolt 54 having a guide rod-forming shank portion 54*b* terminating at the top of a head block 50 or 50' in a reduced threaded portion 54*c* passing through a vertical bore 54*g* in the head block 50 or 50' and secured by a nut 54*d* located in a recess 54*h* in the top surface of the associated head block. The head blocks 50 and 50' are also anchored to the main body portion of the associated housing structure module by a horizontal anchoring pins 54*a* which pass through aligned apertures in the housing block and housing structure modules. The pins 54*a* are inserted in these apertures from the head block recesses 54*h*.

The guide rod-forming shank portions 54*b* terminate at the bottom of the bottom plate 42' or 42" in anchoring screw-receiving portions 54*e* which receive the threaded shanks of anchoring screws 54'. The guide rod-forming shank portions 54*b* guide the vertical movement of the float and barrier wall structure 38.

When the upwardly facing surfaces 37 of the flanged portion 36*a* of the float and barrier wall structure meets the bottom of the head blocks 50 and 50' the associated sealing gaskets 56 are compressed, forming a water tight seal between the upwardly facing surfaces 37 of the float and barrier wall structure and the associated head block 50 (FIG. 4). The sealing gaskets 56 prevent liquid from reaching ground level after filling the chamber 30.

To prevent liquid from flowing around the ends of the float and barrier wall structure modules 38' and 38" while above ground level, the bottom of the end caps 41 at the ends of the float and barrier wall structure 38 (FIG. 7) are provided with flanges 41*c* forming a continuation of the flanged portions 36*a* of the outermost float and barrier wall structure modules 38' and 38". Each end cap 41 is connected to one of these outermost modules by a dovetail key structure 41*a* which fits into a dovetail receiving slot (not shown) located on the end of each module. For further reinforcement of the water-tight seal, a water-proof adhesive is applied to the confronting end faces 39 of the float and barrier wall structure modules 38' and 38" and the end caps 41.

When the float and barrier wall structure is above ground, each end cap 41 is positioned within a sealing gasket 40 in a guide channel 48*a* of a vertically extending seal-forming guide member or bracket 48 secured to a fixed structure, like the inner surfaces of the side walls 13 and 13 of the driveway 11 (FIG. 1). Each bracket 48 has anchoring flanges 48*b* with anchor screw-receiving holes 48*c* to receive anchoring screws 48*d*. In order to achieve a water-tight seal between end cap 41 and the guide channel 48*a* of the associated seal-forming guide bracket 48, the gasket 40 is compressed by the entry of an end cap 41 into the guide channel 48*a*. The top portion 41*d* of each end cap 41 is rounded so that the end cap 41 can easily enter the gasket 40 when the barrier wall and float structure 38 rises above the level of the driveway 11. In addition to forming a water-tight seal with each end cap 41 of the float and barrier wall structure, the guide channel 48*a* also assists in guiding the up and down movement of the float and barrier wall structure 38.

The housing structure head blocks 50 and 50' of adjacent housing structure modules 26' and 26" are connected to one another in the manner shown in FIG. 7. There is a head block 50 or 50' anchored to each side of the upper extremities of the float-receiving chambers 30' and 30" in the housing structure modules 26' and 26". Each of these blocks is anchored to the housing structure, in a manner previously described. The corresponding head block of adjacent housing structure module 26' and 26" are sealingly interconnected. To this end, the head blocks 50 and 50' are connected by locking pins 50*a* each having a groove 50*a'* spaced approximately one-third the length of each pin from each end of the pin 50*a*. One end of each locking pin 50*a* is inserted into an orifice 50*c* within the head block 50 or 50'. A retaining clip 50*d* is inserted into a slot 50*e* at the top of each head block 50 or 50' so that the retaining clip 50*d* snaps within the groove 50*a'* of the locking pin 50*a* when it is inserted into the associated head block, to lock the locking pin 50*a* into the head block. To maintain a water-tight seal between the head blocks 50 and 50' of adjacent housing structure modules, gaskets 50b made of a compressible material are placed between the end faces of adjacent blocks. These gaskets have apertures 50b' which receive the associated locking pins 50a, as seen in FIG. 7.

It will be recalled that when the float and housing structure 38 reaches its uppermost position, the upwardly facing surface on the flanged portion 36a of the structure will sealingly and pressingly engage the gasket strips 56 supported on the bottom surfaces of the housing blocks 50 and 50 (see FIG. 7). A similar sealing action must occur between the flanged portion 41c of each end cap 41 secured to the ends of the outermost modules 38' and 38" of the barrier wall float and structure 38. To this end, there must be secured between the head blocks 50 and 50 at the outer end of each of the outermost modules 38' and 38" a generally U-shaped head block bridging member 50A. Each U-shaped head block bridging member 50A has a similarly U-shaped sealing gasket 56a located on its downwardly facing surface so that a water-tight seal forms around the associated end cap 41 and the upwardly facing surface of the flanged portion of the associated float and barrier wall structure. Each end cap head block bridging member 50A is secured to the end of the head block 50 or 50' by the same locking pin assembly elements 50a, 50b and 50d as described above for interconnecting the head blocks of adjacent housing structure modules 26' and 26".

The user has the option of having the flood water barrier system 10 installed, preferably at the time of construction of a new house, or buying and installing the system 10 himself. Similarly, the flood water barrier system 10 can be shipped preassembled or in parts that the user can then assemble himself, if desired. The housing structure modules 26' and 26" and corresponding float and barrier wall structure modules 38' and 38" can come in standard lengths, such as of four, six or eight feet, or each module can be custom designed depending on the area needing protection.

An important feature of the float and barrier wall structure is that it can be completely removed from the housing structure 26, for ease of assembly and disassembly, as well as, cleaning or replacing units. To assist in the removal of the float and barrier wall structure, slots 55a (FIG. 7) are provided along the entire length of the flanged portion 36a of the structure. When the float and barrier wall structure 38 is lifted completely out of the housing structure 26, the slots 55a provide the clearance necessary for the L-shaped supporting fingers 55 which extend outwardly from the uppermost inside surface of the housing structure 26 (FIG. 7).

Figure 14:
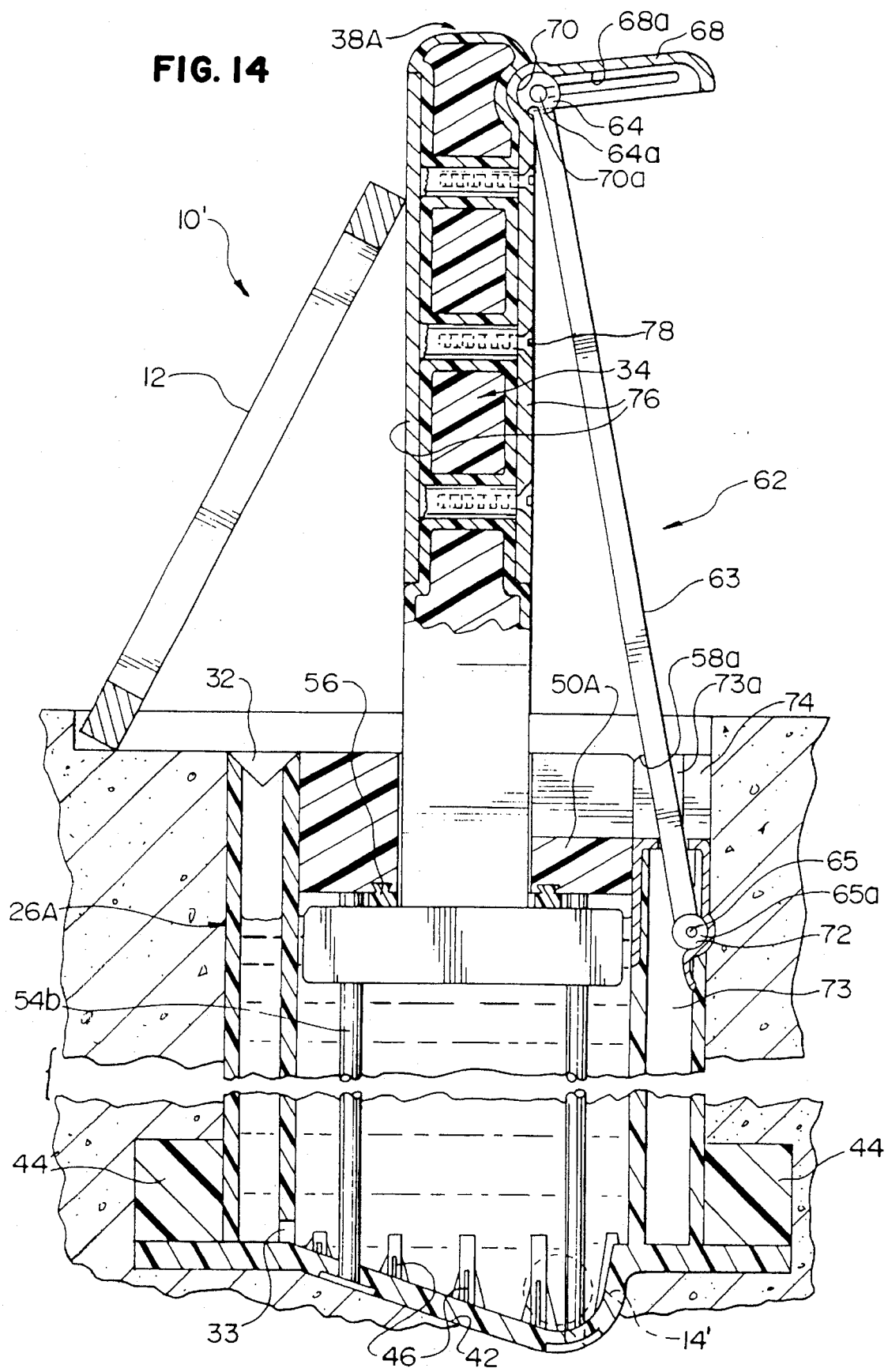
FIG. 14 is a vertical sectional view through a preferred embodiment of the invention showing the combined float and barrier wall structure in its upward extended position, the embodiment varying from that shown in FIGS. 1–13.
Figure 15:
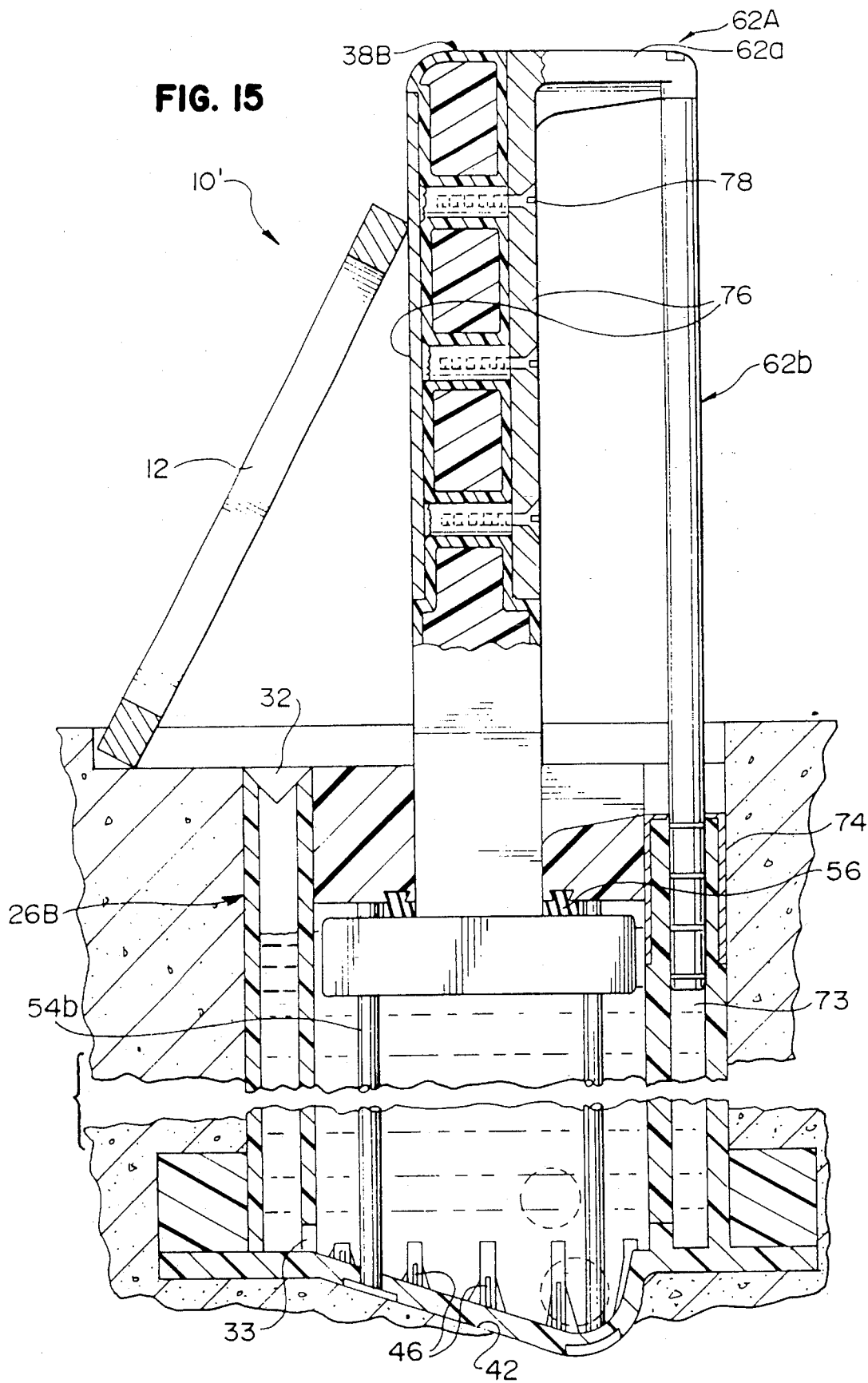
FIG. 15 shows another embodiment of the present invention.
Figure 24:
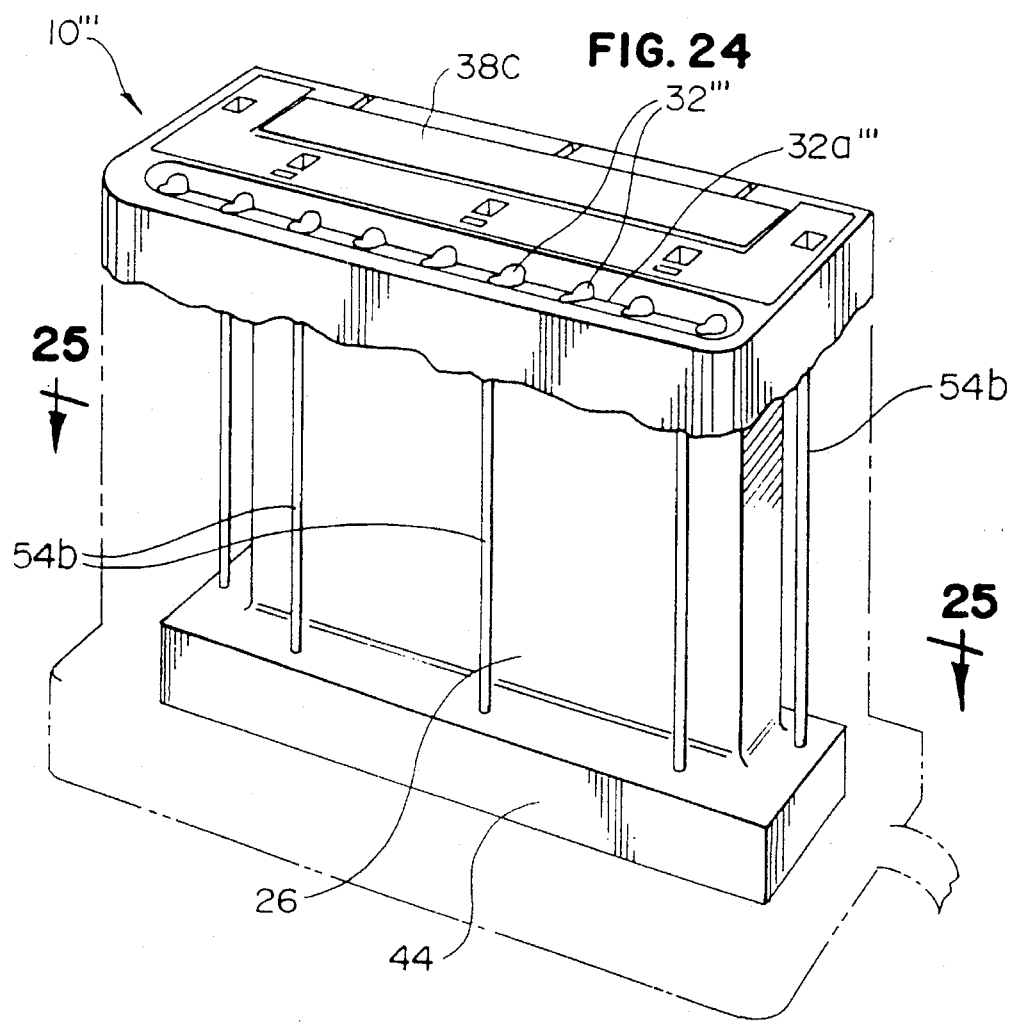
FIG. 24 is a cut-away view of the barrier wall-forming apparatus of FIG. 16, showing the guide rods and other portions of the apparatus when the float and barrier wall structure is in its lowered position.
Figure 25:
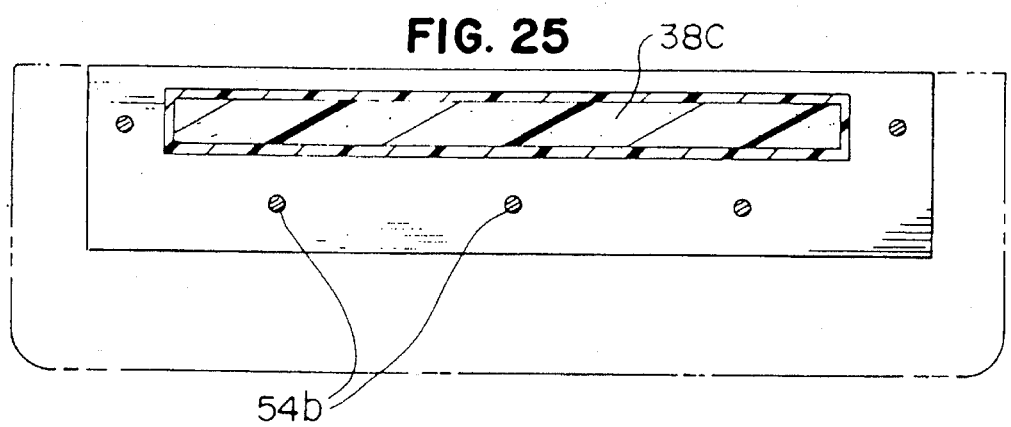
FIG. 25 is a horizontal sectional view of the barrier-forming apparatus illustrated in FIG. 24, taken along viewing plane 25—25 therein.

FIGS. 14–15 Embodiment

Referring to FIG. 14, a preferred barrier wall system 10' of the present invention is shown. It incorporates the same features as described previously, with some key differences that will be detailed below. One feature is that the bottom closure plate 48 slopes downward at approximately a 45 degree angle forming a collection space for silt or other debris. In this embodiment, the spacer pins 46 are graduated in size to accommodate the slope, yet form a level surface for a float and barrier wall structure to rest on. FIG. 14 further illustrates an alternative to the float and barrier wall structure 38A. In this embodiment, the float structure 34 is constructed separately in a sectional-like manner. A barrier-forming plate 76 is then attached to both sides of the float structure 34 using a series of screws or bolts 78. The float structure 34 and the barrier-forming plates 76 attached thereto, together form the barrier wall and float structure 38A of this preferred embodiment. This structure moves up and down with the water level changes in the float-receiving chamber 30 unlike the float and barrier wall structure 38 which locks in its fully raised position.

As illustrated in FIG. 14, while above ground, the float and barrier wall structure 38A is supported in its raised position against the force of the rising water by a series of support rod strut assemblies 62. Each support strut assembly 62 consists of a support rod 63 connected by suitable securing means 64a to a roller 64 at the top end, and securing means 65a to another roller 65 at the bottom end. When the float and barrier wall structure 38a is below ground, the support rod 63 is located in a vertical channel 73 positioned within the housing structure 26A, typically on the side opposite the side of the float and barrier wall structure 38 where flood water is to be present. At its top end, the support rod 63 is connected by the roller 64 to a roller guide arm 68 which extends outwardly from the uppermost portion of the side of the float and barrier wall structure 38A. The arm 68 has a roller guide channel 68a which has a slight incline toward the float and barrier wall structure 38A so that gravity will urge the top roller 64 to roll in toward the float and barrier wall structure 38A. When the float and barrier wall structure is near its fully raised position, the lower roller 65 rises over a camming surface formed in the housing structure and rolls into a holding recess 72. The top of the channel 73 has an opening 73a which of a size provides clearance spaces which permits the rod 63 to pivot to the left as viewed in FIG. 14 when the float and barrier wall structure 38A rises above ground level. Initially, when the float and barrier wall structure 38A is in its fully lowered position, each top roller 68 is positioned in the upper, right hand end of the guide channel 64a of the associated roller guide arm 68. When the float and barrier wall structure 38A rises in the vertical channel 73, the support rod 63 rises simultaneously and initially parallel to the float and barrier wall structure 38A. As the float and barrier wall structure 38A rises into its uppermost position, the top roller 64 moves downwardly along the guide channel 68a and the support rod 63 pivots counterclockwise as viewed in FIG. 14. The top roller 64 rolls into an upwardly indented recess 70 at the end of the guide channel 68a which provides a holding shoulder 70a. When the lower roller enters the holding recess 72, the water forces applied against the barrier wall are braced by the upwardly inclining margins of the guide channel 68a. The raised rods 63 of the various support strut assemblies then rest against support shoulders 58a formed in a modified head block 50A. As the water in the float-receiving chamber drains thereof, the weight of the float and barrier wall structure no longer buoyed by the water forces the lower roller 65 from the holding recesses 72 so that the float and barrier wall structure moves down as the water lowers in the float-receiving chamber.

An alternative barrier system 10" of the present invention is illustrated in FIG. 15. It is similar to the barrier system 10' of FIG. 14 except for the barrier wall and strut assembly structure. The important difference of this embodiment is the construction of a modified support strut assembly 62A, illustrated in FIG. 15. It includes a vertical piston 62b connected at its top to the end of a horizontal arm 62a extending from the top of the float and barrier wall structure 38B. The piston 62b is mounted for vertical movement in a channel 73 in the housing structure 26B. The piston 62b is always in a vertical position parallel to the float and barrier wall structure 38B. The arm 62a is attached to a bracket plate 76 secured to the float and barrier wall structure 38B by screws 78. As the float and barrier wall structure 38B rises, the piston 62*b* rises with it in a parallel manner. The float and barrier wall structure 38*b* is not locked in an upper position. Rather, it moves up and down as the level of the water in the float chamber varies.

FIGS. 16–25 Embodiment

FIGS. 16–25 disclose another barrier wall system 10''' of the present invention with slight modifications, to protect a doorway 80 in the event of a flood. This barrier wall system can also be used to seal water from window openings which extend to a point near ground level. As can be seen in FIGS. 16 and 21, the door flood water barrier system 10''' comprises a similar housing structure 26 and a similar float and barrier wall structure 38C as previously described. Due to the smaller size of this system, one side of the housing structure head block 50*a* is held in place by guide rod and head block anchoring bolt assemblies 54, as previously described in the other embodiments, while the other head block 50*b* is held in place by anchor screws 57 (FIGS. 21–23). The anchor screws 57 are anchored directly into the foundation concrete 15 surrounding the housing structure of the barrier system 10''' and assist in keeping the head block 50*a* from being pushed up by the force of the flanged bottom portion of the float and barrier wall structure 38C when it rises into its uppermost position.

The door flood water barrier wall system 10''' also includes, instead of the support strut assemblies used in the driveway flood control system previously described, a pair of guide wheel assemblies (FIGS. 17–19) which are activated by springs 81*g* (FIGS. 18–19). Each guide wheel assembly 81 comprises a wheel 81*a* located between the legs 81*b* of a bifurcated wheel carrying arm 81*c* (FIG. 17). The arm 81*c* extends into a housing 81*d* pivotally mounted by a shaft 81*f* at its inner end to the shell of the float and barrier wall structure 38C. Each arm 81*c* has a lateral pin 81*e* riding in a slot in the housing 81*d*. The spring 81*g* urges the wheel-carrying arm to its fully extendable position within the housing 81*d*. When the float and barrier wall structure 38C is in a recessed position, under non-flood conditions, the guide wheels 81 are held in an upright position within a channel 82 in the housing structure 26. Under flood conditions, when the float and barrier wall structure 38C begins to rise, the guide wheels 81 leave the channel 82 and pivot downward under the force of a second spring 81*h* connecting the shaft 81*f* to the shell of the float and barrier wall structure 38. Each guide wheel 81 contacts the door frame 80*a* thus bracing the float and barrier wall structure 38C against the force of flood water.

To prevent water from going around the extended float and barrier wall structure 38C, a compressible sealing strip 80*b* is adhesively affixed to the door frame 80*a* (FIG. 16). When the float and barrier wall structure 38C is in its full upright position, the sealing strip 80*b* is compressed between the float and barrier wall structure 38C and the door frame 80*a* creating an effective water-tight seal.

FIGS. 26–29 Embodiments

Figure 26:
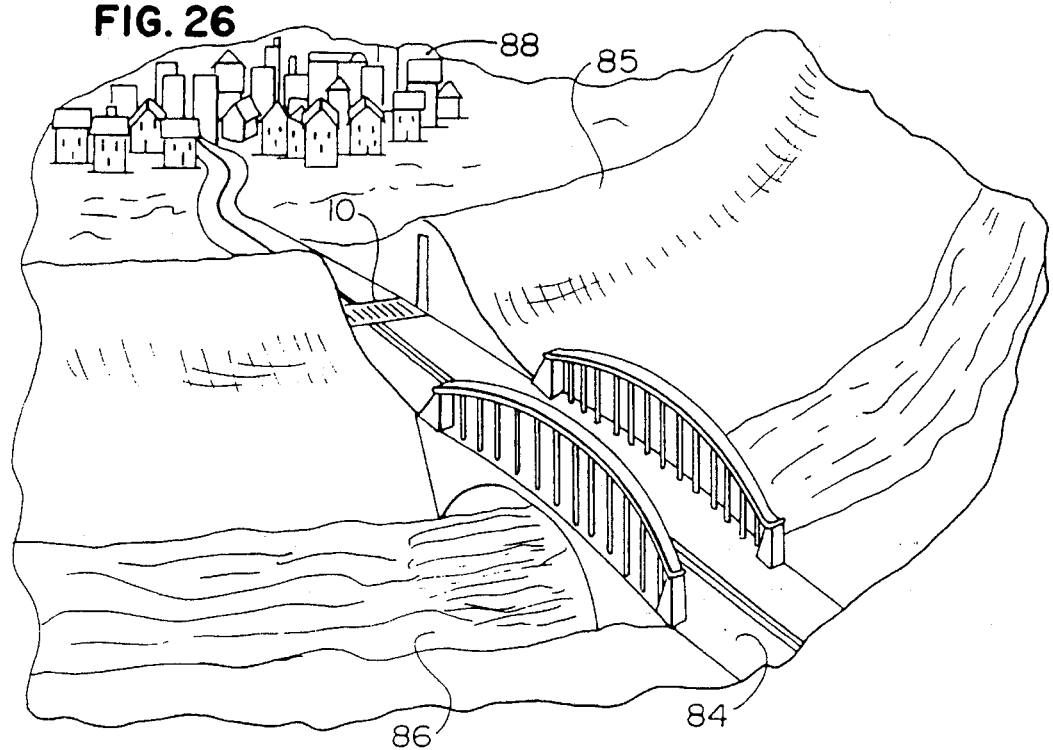
FIG. 26 is an alternate embodiment of the barrier-forming apparatus of the invention applied across a highway.

FIG. 26 shows an alternative use of the barrier wall system 10 of FIG. 1 placed across a highway 84. The highway 84 is there shown situated close to a potentially flooding river 86, and leading to a town or city 88 where the highway 84 cuts through a hillside 85 running along the river.

Figure 27:
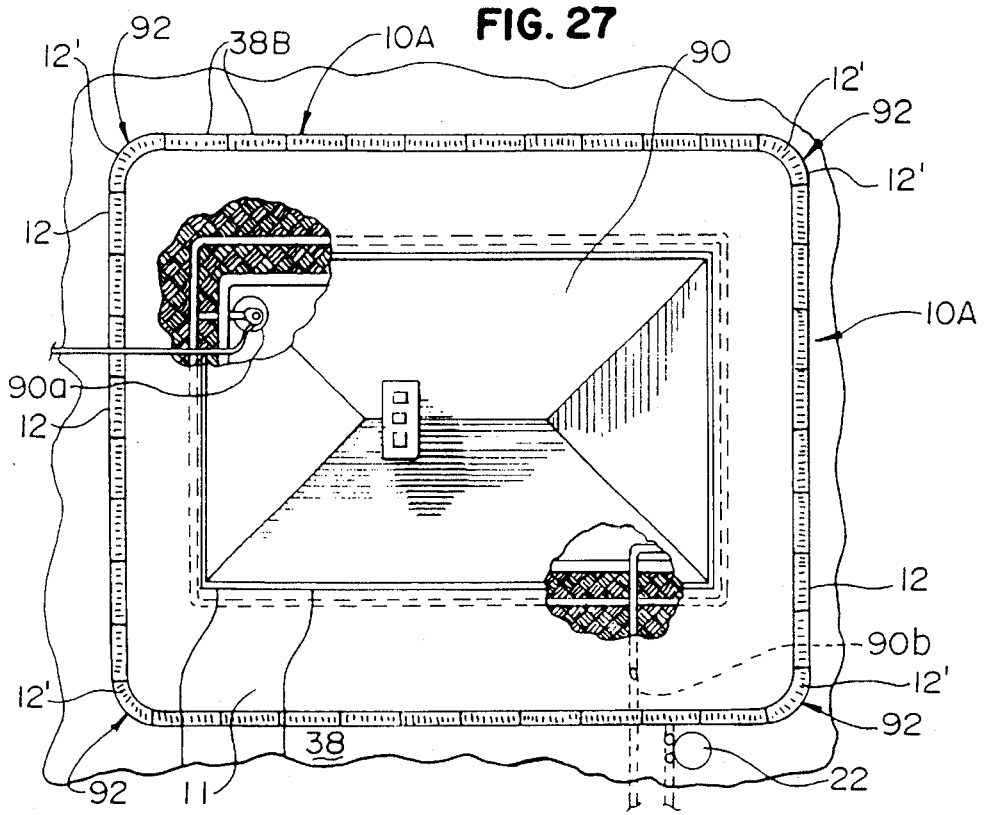
FIG. 27 is another alternate embodiment of the barrier wall-forming apparatus of the invention applied around a house.

FIG. 27 shows an alternative use of a barrier wall system 10A of the invention using a barrier wall similar to that shown in FIGS. 14 or 15, where the wall moves up and down with the level of the water in the float chamber. The house flood water barrier system 10A would be useful around an individual house 90, especially one located near a potentially flooding body of water, and could be activated by the homeowner when the sump pump 90*a* and the sewer line 90*b* located in the house 90, are unable to handle flood risk conditions. In this form of the invention, instead of the barrier wall being formed by a few modules as in the form of the invention shown in FIGS. 1 and 26 where the barrier wall spans only a relatively small distance, in the form of the invention shown in FIG. 27 the barrier wall comprises a multiplicity of straight modules interconnected in a manner described for the embodiment of the invention as best shown in FIG. 7 and rounded corner modules 92 shown in FIG. 28. Except for the shape of the modules involved, the structure of the curved modules 92 are similar to that described for the straight modules shown in FIG. 1. Also, the float and barrier wall modules of the system shown in FIG. 27 do not have end caps 41 and the housing structure end caps 31' shown in FIG. 7, since the barrier wall system provides a continuous barrier wall in a closed loop. Also, the vertical ends of the various straight and curved modules continuously interfit in the same way that the confronting faces of the two housing structure and float and barrier wall modules 26'–26'' and 38'–38'' described in connection with the embodiment of the invention shown in FIGS. 2B, 2C, 2D and 7 are connected.

The drain apertures from the resulting continuous float-receiving chambers of these curved and straight modules are made by drain holes which for example, would be formed in the bottommost portion of the inclined bottom wall of the chamber (see dashed lines 14' in FIG. 14 showing the location of such a drain holes). FIG. 27 shows a series of straight grates 12 and curved grates 12' which cover the barrier system 10A when no flood risk condition exists.

Figure 29:
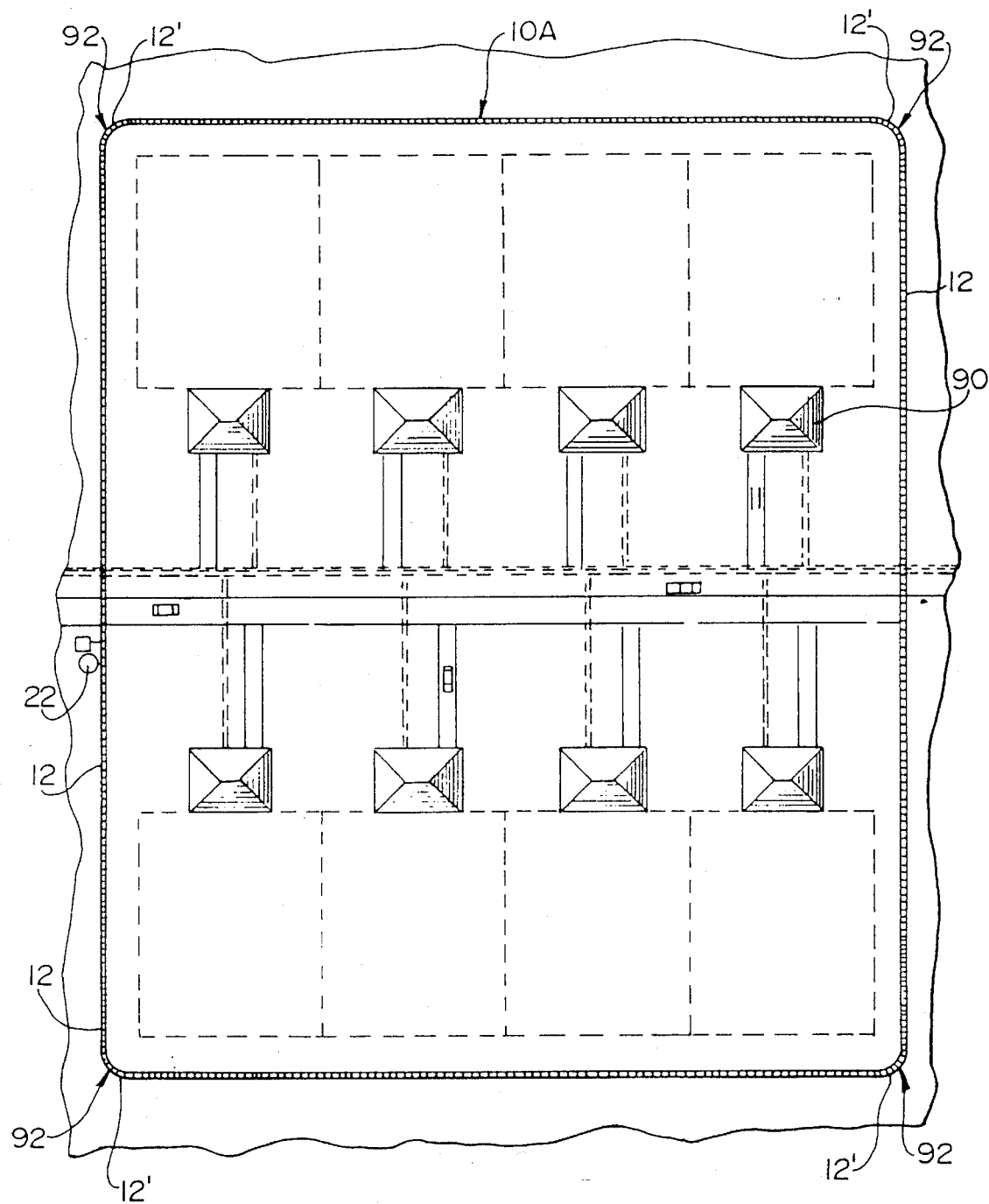
FIG. 29 is another alternate embodiment of the barrier-forming apparatus of the invention applied around a housing subdivision.

FIG. 29 represents still another use for the barrier wall system 10A shown in FIG. 27. Here, the water barrier system surrounds an entire subdivision.

Figure 30:
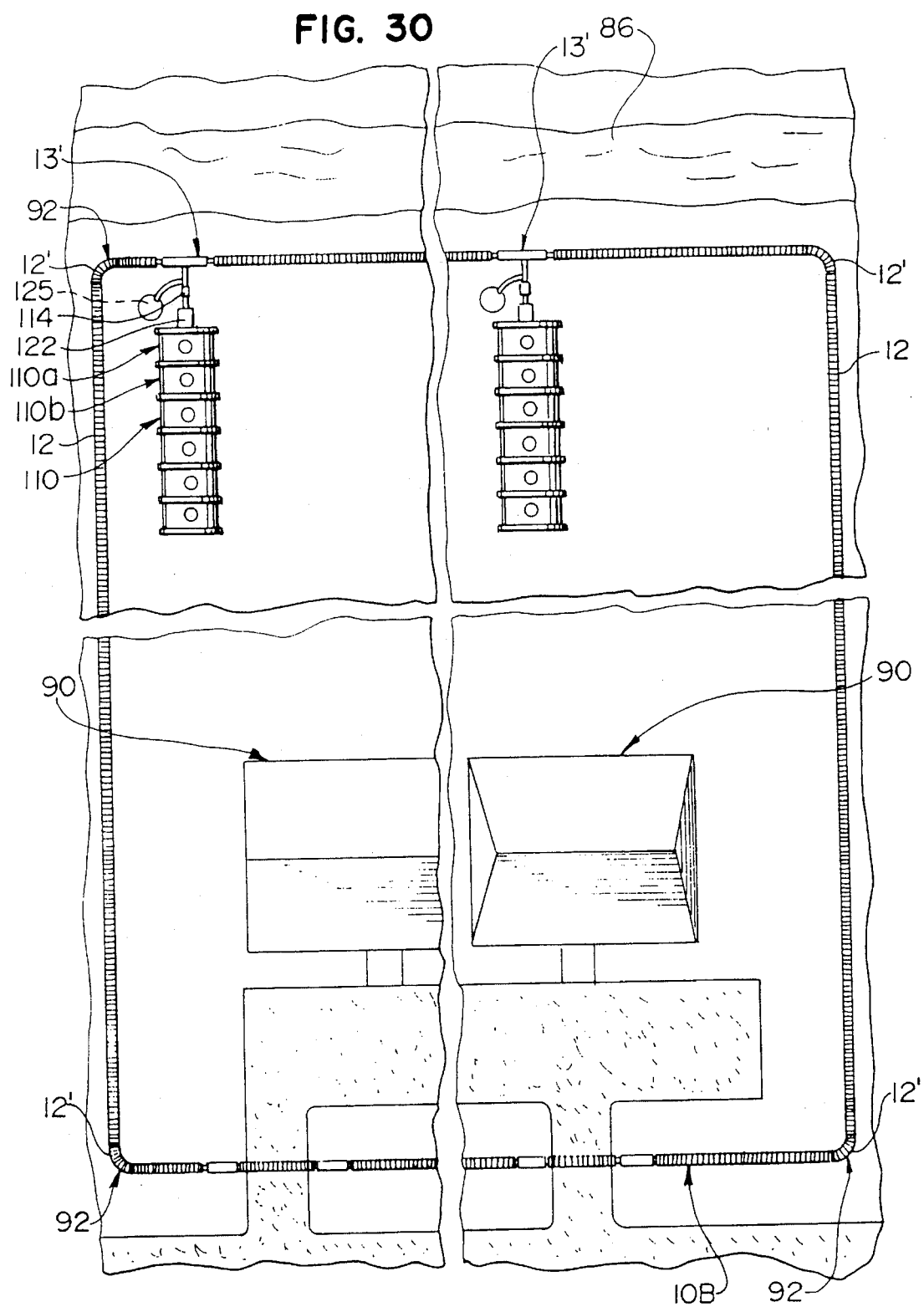
FIG. 30 shows still another alternate embodiment of the barrier wall-forming apparatus of the invention in the absence of flood conditions and applied around an entire farming region including two or more farms, and wherein when flood conditions exist flood water is automatically collected in storage tanks, so that when the flood subsides there is water in the storage tank for irrigation or other purposes.
Figure 33:
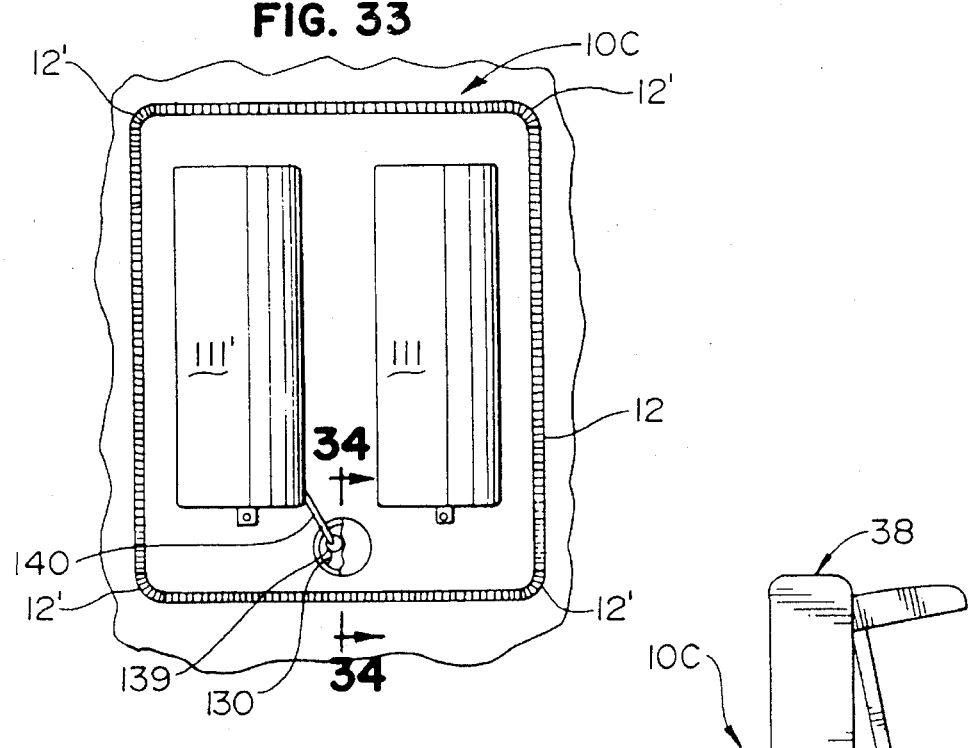
FIG. 33 is still another alternate embodiment of the barrier wall-forming apparatus of the invention wherein the barrier wall formed thereby surrounds a storage tank having hazardous liquid, so that spillage of the liquid is maintained within the area enclosed by the barrier wall.

FIGS. 30–32 Embodiment

The embodiment of the invention shown in FIG. 30 is a barrier wall system 10B which surrounds an entire farm area along which runs a river 86 which can flood the entire farm area, except for the presence of applicant's barrier system 10B shown therein. FIG. 30 shows such a single barrier wall system where the farming area includes a number of farms including farm houses 90—90. This barrier wall system 10B includes almost the same barrier wall system shown in FIGS. 27 and 28, except that it also includes a system for storing flood water in storage tanks or vessels 110 and concrete pillars 13' opposite each storage tank 110. The pillars 13' interrupt what would otherwise be a continuous barrier wall as found in the FIGS. 27 and 28 barrier wall system. At least one storage tank 110 is associated with each farm for storing water to be used for irrigation purposes. Each tank 110 is located within the barrier wall system near the section thereof opposite the river 86. In a manner to be explained, if the river 86 rises to a point which can flood the farmland involved, some of this flood water will automatically be fed in the tanks 110. Also, in a manner to be explained, where the farmland includes a drain tile system for draining water from the farmland, a sump pump automatically feed this drain water into the tanks 110. As best shown in FIG. 32, each pillar 13' has an opening 13*a'* through which extends an outwardly and upwardly inclining water inlet conduit section 112a whose outlet end is at or near ground level and whose inlet end is slightly above ground level. The outlet end of the inclined conduit section 112a is connected to the inlet end of a one-way valve 114 whose outlet is connected to a conduit section 112b, in turn, extending to an inlet opening 116 near the bottom of the associated storage tank 110.

If the river 86 rises to a point where it spills into the various grates 12 forming part of the barrier wall system, and the drain system of the float-receiving chambers will generally not be able to prevent filling of the interconnecting float-receiving chambers of the barrier wall system modules. The barrier wall will then rise to its full height. When the river water rises above the level of the inlet end of the inlet conduit section 112a, river water will then enter and flow through the conduit section 112a and the one-way valve 114 which permits water flow toward but not from the tank 110. The water then flows into the storage tank 110 to be a subsequent supply of irrigation water for the farmland involved.

Each storage tank 110 has air pressure release apertures 133 at the top thereof for eliminating back pressure when water rises in the tank.

The storage tanks 110 preferably have a height much greater than the expected height of the flood water which is obviously below the height of the barrier wall. FIG. 31 shows a pair of float and barrier wall modules 38B'—38B' passing into guide channels of a pair of vertical brackets 48 like those described in connection with the barrier wall system of FIGS. 1–13 and as best shown in FIG. 7.

If there is drain tile system 127 in the farmland involved, the water collected by this drain tile system is fed to a conventional sump pump-containing chamber 125 containing a sump pump 124 on the bottom thereof. When water builds up in the chamber 125 to a point which automatically turns the sump pump on, the outlet end of the sump pump will feed water through a one-way valve 128, permitting water flow into a conduit section 130 shown extending to the inlet end of the inlet conduit section 112a. The sump pump then feeds this water through the one-way valve 114 into the storage tank 110.

When it is desired to use the water in the tank 110 for irrigation purposes, an on-off valve 132 associated with a discharge spigot shown in FIG. 32 connected to the conduit section 112b will be opened to permit the water to drain into irrigation channels of the farmland involved.

The storage tanks 110 may be of a type which can be built up from individual, open-ended cylindrical sections 110a, 110b with sealed interfitting ends, so that storage tanks of any desired size can be built up from such tank-forming sections. The outermost section of each tank 110 is closed by a separate end wall section 110c which interfits with the adjacent open end of the tank section 110c shown in FIG. 32. One of the tank end walls 110c has an opening through which passes the horizontal extension of a vertically extending pipe section 120a connected to a horizontal pipe section 120b running along the bottom of each tank 110. The pipe section 120b has upwardly facing air discharge holes throughout its length, to permit the aeration of the water stored in the storage tank 110. An air pump 122 shown sitting on a pedestal 124a associated with a support structure 124 forces air through the pipe sections 120a and 120b when energized.

FIGS. 33–34 EMBODIMENT

Figure 28:
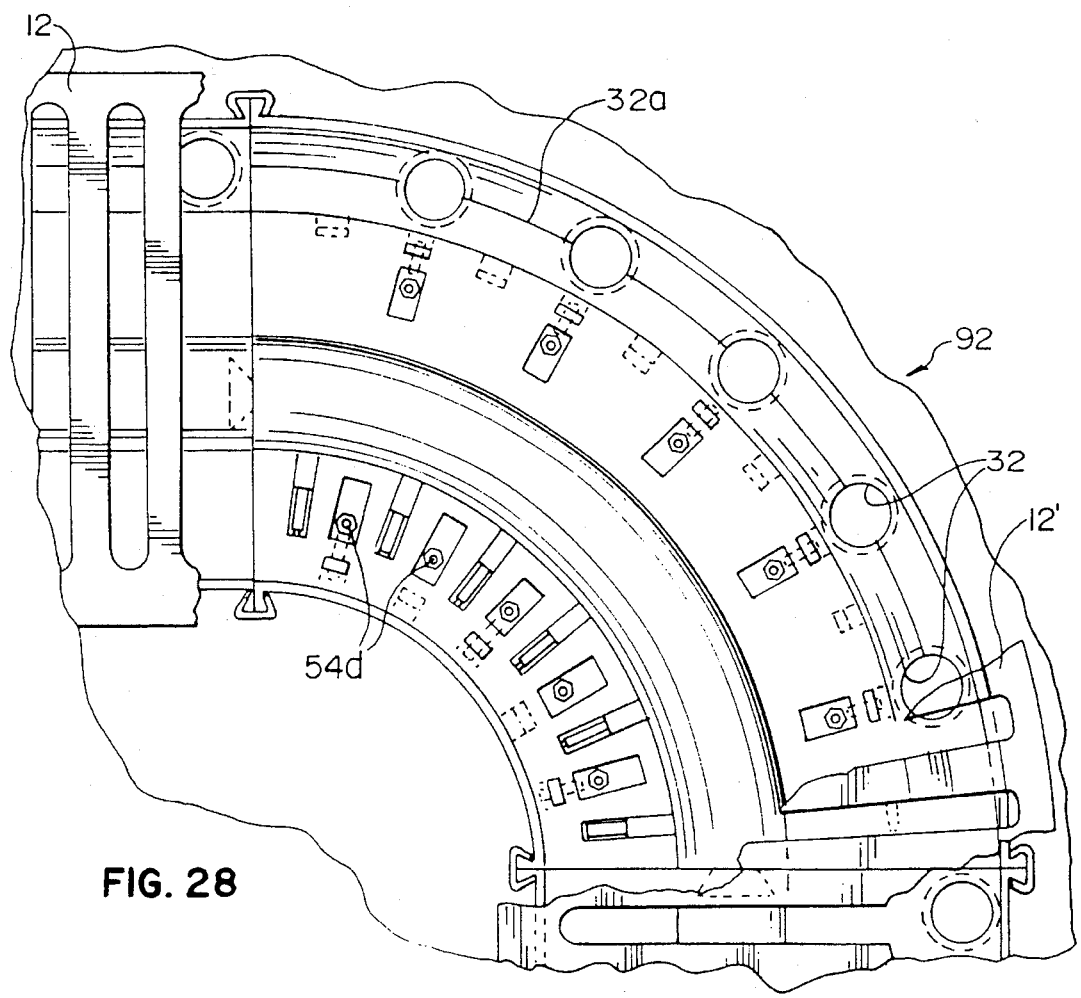
FIG. 28 is an enlarged, fragmentary view of one of the curved corner modules of the barrier-forming apparatus shown in FIG. 27.

The embodiment of the invention shown in these figures is a barrier wall system 10C which surrounds an area including a tank 111 for storage of a hazardous material. Enclosed within this area is also a second storage 111' tank which is to be used to receive a hazardous material should tank 110 become defective and spill the material onto the floor. The barrier wall system 10C can be identical to the barrier wall system shown in FIGS. 26–27, except that it is designed to keep liquid which spills upon the floor within the confines of the barrier wall system. In FIGS. 27 and 28, the purpose of the barrier wall system is to prevent water on the outside of that barrier wall system from getting within the area enclosed by the system.

Figure 34:
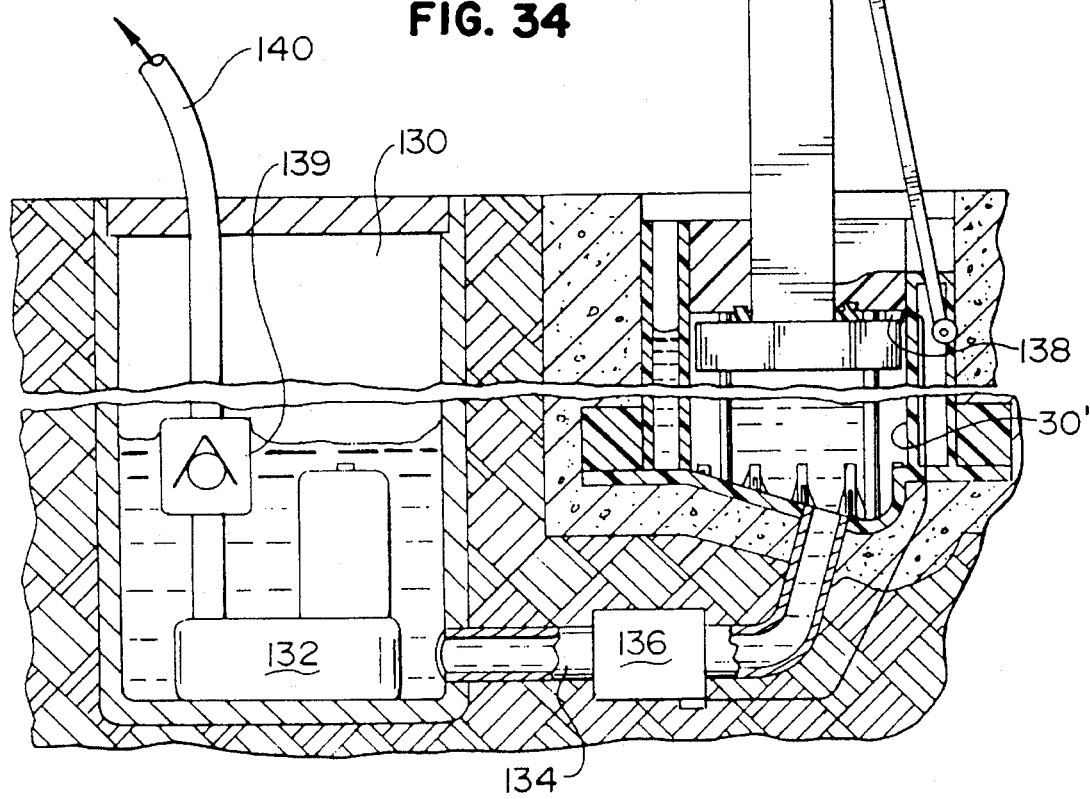
FIG. 34 shows a vertical sectional view through a portion of the apparatus shown in FIG. 33 which shows the manner in which the barrier wall system of the invention combined with a pump sump system for directing liquid spilling from its normal storage tank into another storage tank.

The barrier wall system 10C includes a series of straight and curved grates 12 and 12' overlying the interconnecting housing structures and float and barrier wall modules of the straight and curved configuration previously described in connection with FIGS. 27 and 28, except that the drain system for the float-receiving chambers drain into a sump pump-containing chamber 130 containing a sump pump 132. In FIG. 34, a conduit 134 is shown extending between the float-containing chamber 30' and the sump pump-containing chamber 130. A solenoid controlled valve 136 which normally closes off the connection between the float chamber and the sump pump-containing chamber 130 is connected with this conduit. Whenever there is a spillage of hazardous fluid from a leaking tank 110, this material flowing into the grates 12 and 12' will flow into the float-receiving chamber 30' and immediately fill the same to cause the barrier wall to rise to its full height, a switch 138 is contacted by the flanged bottom portion of the float and barrier wall structures of one of the barrier system modules. This will open the valve 136 to allow passage of additional liquid flowing into the interconnected module chambers 30' to flow into the sump pump-containing chamber 130. The sump pump 132 then automatically pumps this liquid into the second storage tank 111' through a conduit 140 having a one-way valve 139 therein.

While the invention has been described with reference to preferred embodiments, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details. Furthermore, while generally specific claimed details of the invention constitute important specific aspects of the invention in appropriate instances, even the specific claims involved should be construed in light of the doctrine of equivalents.

FIGS. 35–37 EMBODIMENT

Figure 35:
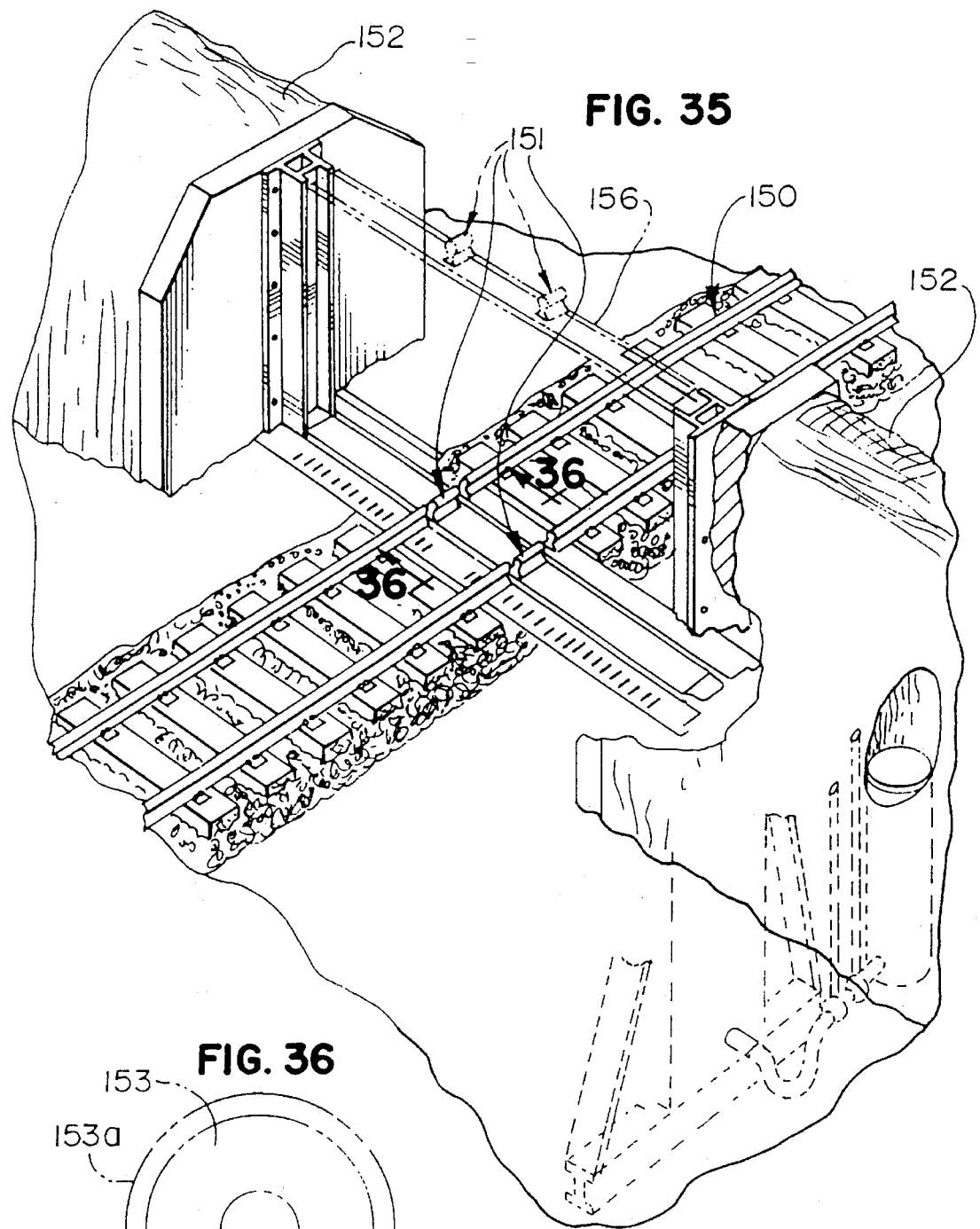
FIG. 35 is another alternative embodiment of the barrier wall-forming apparatus of the invention applied across a railroad track passing through a levee.
Figure 36:
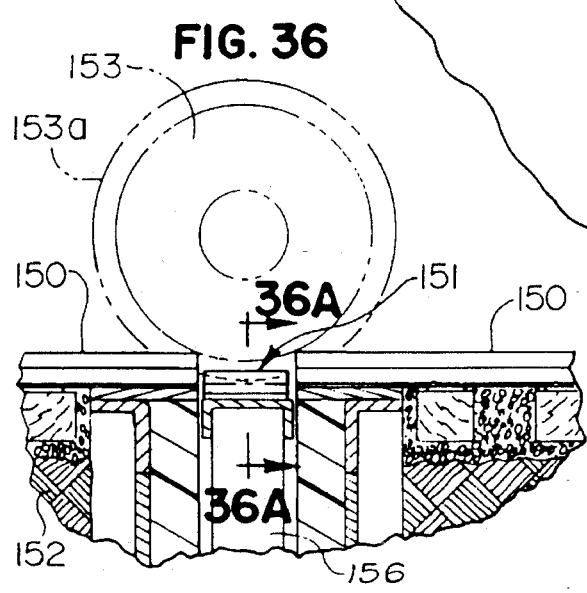
FIG. 36 is a side view of the track segment in a slightly lowered position from the remaining tracks.
Figure 36A:
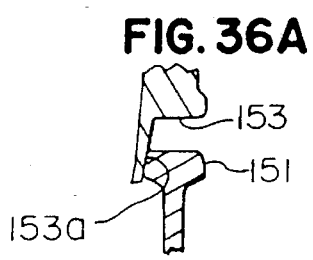
FIG. 36A is a sectional view of the train wheel flange on the track segment.

FIG. 35 shows an alternative use of the barrier wall system 10D placed across a railroad track 150. This barrier wall system 10D is particularly useful for railroad tracks 150 passing through levees 152 located near a river 154 or other potentially flooding body of water. When the barrier wall system 10D is in a retracted position below the tracks 150, the center top of a float and barrier wall structure 156 is covered by a track segment 151. The track segment 151 rests fractionally below the remaining track 150. The slightly depressed position of the track segment 151 maintains the continuity of the track 150, while slightly displacing the full weight of a passing train from the barrier system 10D by engaging the flanged portion 153a of a train wheel 153 only on a lateral side (FIG. 36A). As shown in FIG. 37, if the river 154 rises to a flooding level, the barrier system 10D is activated as described in previous embodiments, carrying the protective track segment 151 on the top of the barrier wall 156 as the wall rises. When the flooding conditions subside, the track segment 151 lowers with the barrier wall 156, falling back into its original position with the rest of the track 150. In this embodiment of the invention, the barrier system 10D is essentially the same construction as described in previous embodiments, having a float and barrier wall structure 156 which rises when a float receiving chamber 158 fills with water. A sealing means 159 as described in previous embodiments, is used to prevent liquid from reaching ground level after filling the chamber 158. In this embodiment, however, the float and barrier wall structure 156 is shown supported by an interlocking I-beam structure 160 instead of the support rod strut assemblies 62 used in the other embodiments (FIG. 36). The I-beam structure 160 constructed preferably of a corrosion resistant metal or plastic, supports the float structure 156 on both outer sides 160a, 160b and in the center 160c. As the float and barrier wall structure 156 rises forming a barrier, the barrier wall is supported from the force of the water by the portion of the I-beam structure 160 remaining below ground level.

FIGS. 38–42 EMBODIMENT

As shown in FIG. 38, an alternative form of the barrier wall system 10E can be placed cross a roadway 170 at the entrance to an underpass 170a or in the area of a spillway (not shown) prone to flash flooding. In this embodiment, the barrier wall system 10E comprises a flexible barrier 172 and a gate 173 which lowers through the aid of its own separate float structure 180 contained in a separate chamber 180a before the flexible barrier wall 172 rises above ground level. The float chamber 180a slowly fills with water when a sewer backup condition develops, such as during flooding conditions, in an area ahead of the barrier wall 172 lowering the gate 173 before the flexible barrier wall 172 rises. The flexible barrier wall 172 may carry at least one flashing warning light 176. Except for the gate 173, the flexible barrier wall system 10E is contained below ground in a slot 178 in the highway 170 narrow enough to allow the support frame 171 holding the flexible barrier 172 to rise during flooding conditions. The slot 178 is narrow enough so as not to interfere with the flow of traffic.

The flexible barrier wall 172 is constructed as either a solid or netting structure from a lightweight flexible and collapsible material, rather than the solid foam core material in the earlier embodiments. Preferably, the material can be reflective or brightly colored. The flexible barrier wall 172 is mounted onto a lightweight support frame 171 using a series of brackets 171a or other attachment means. A sealing means is not necessary with this embodiment, as described with previous embodiments, because the flexible barrier wall 172 is not used as a water barrier. The supporting frame 171 is further connected to an underground float 174 and float receiving chamber 175 of the type described previously. When water enters the underground float receiving chamber 175 from a drain 175a located between the barrier system 172 and the flooding area, the float structure 174 rises, carrying the flexible barrier wall 172 above ground level. In addition to the flexible barrier wall 172, this embodiment includes a gate 173, similar to railroad crossings gates, which is located in front of the flexible barrier wall system 10E (FIG. 40). The gate 173 is lowered using a similar, yet smaller scale float structure 180 contained in its own float receiving chamber 180a, separate from the chamber 175 for the flexible barrier's float structure 174. As water enters the small float-containing chamber 180a located below ground level, the float structure 180 rises pivoting the gate 173 into a full horizontal position before the flexible barrier wall 172 starts to appear above the level of the roadway 170 (FIG. 41). The float-containing chamber 180a of the gate 173 is small enough that it fills rapidly with water under flooding conditions so that the gate 173 is in a lowered position, providing an initial warning to motorists of the rising flexible barrier wall 172 and the closed highway. Preferably, the gate 173 is painted with a reflective paint, so the gate 173 is easily seen, even at night.

At least one warning light 182 can be positioned preferably on the side of the support frame 171 of the barrier wall 172. The warning lights 182 would rise with the flexible barrier 172 and would begin to flash when the flexible barrier 172 is in its upward position. Solar-charged batteries (not shown) could be used to power the flashing warning lights 182.

As shown if FIG. 39, a warning sign 184 can be incorporated into the construction of the flexible barrier 172. The warning sign 184 can be painted onto the flexible barrier 172 with a bright and reflective paint, or attached as a separate sheet of material onto the flexible barrier 172. More preferably, the warning sign 184 can be constructed as an integral part of the flexible barrier 172 for example, by weaving the warning letters directly into the barrier material.

Preferably, the barrier wall system 10E would be located just past an exit ramp 170b so that motorists could exit the blocked highway before reaching the underpass 170a or flooded spillway area.

I claim:

1. Liquid barrier-forming apparatus for presenting under flood risk conditions an above ground level liquid barrier wall spanning the space between at least two given spaced points to stop water flow to one side of said wall; said liquid barrier-forming apparatus comprising:

a housing structure to be buried below ground level to underlie said space between said two points, said housing structure having a float-receiving chamber and at least one ground liquid inlet passageway having an inlet at the top of said housing and extending between the top of said housing structure to the bottom portion of said chamber so that ground liquid can fill said chamber when permitted to do so;

a float structure for said chamber which is sized to be vertically movable therein from a bottommost position therein when there is no liquid build up therein to a given level and to an uppermost position when the liquid rises therein and said chamber fills with liquid;

and there being associated with said float structure for movement therewith a barrier wall-forming means which is initially located at or below ground level when said float structure is in said bottommost position and is fully above ground level to form a barrier wall preventing flow of liquid to the other desired dry side of said wall when said float structure is in said uppermost position.

2. The apparatus of claim 1 wherein said housing structure is buried below ground with said float structure and the associated barrier wall-forming means is mounted in said float-receiving chamber.

3. The apparatus of claim 2 wherein there is provided liquid draining means communicating with the bottom of said chamber for draining liquid from the bottom thereof to prevent the buildup of liquid in said chamber to said given level except under flood risk conditions.

4. The apparatus of claim 2 wherein said chamber is initially devoid of any draining means so that said chamber will immediately begin to fill with liquid when liquid flows into the same so said barrier wall will begin to rise when said chamber begins to fill with liquid.

5. The apparatus of claim 1 wherein said inlet passageway is on the side of said housing structure wherein, when said carrier wall in its raised position, said inlet passageway is on the side of said barrier-forming wall facing the source of liquid flowing into said chamber.

6. The apparatus of claim 1 wherein the top of said housing structure has a liquid-receiving trough running substantially the full length thereof, so that the source of water or other liquid flows into said trough, and the inlet of said inlet passageway communicates with said trough to receive liquid therefrom.

7. The apparatus of claim 2 further provided with an apertured grate which rests on shoulders of a recess formed in a roadway to isolate said barrier wall from the weight of vehicles or persons passing thereabove so that the grate carries the weight of any vehicle passing thereover, said rate covering the top of said barrier wall when said barrier wall is retracted within said chamber.

8. The apparatus of claim 1 further provided with seal-forming means for preventing the liquid in said chamber from gaining access to ground level on the desired dry side of said barrier wall after said liquid rises in the chamber to fill the same and for preventing liquid at ground level on the outer ends of said barrier wall from flowing around the ends to the desired dry side thereof.

9. The apparatus of claim 8 wherein said seal-forming means includes downwardly facing surfaces on said housing structure and upwardly facing surfaces on said float structure surfaces which surfaces are forced by the upward buoyancy forces on said float structure into water sealing contact with said downwardly facing surfaces of said housing structure.

10. The apparatus of claim 9 wherein said seal-forming means includes a compressible sealing gasket secured to one of said downwardly facing surfaces of said housing structure and upwardly facing surfaces of said float structure.

11. The apparatus of claim 8 wherein said barrier wall is an integral part of said float structure to form a combined barrier wall and float structure which moves up in said chamber therewith to extend above ground level as said water or other liquid fills said chamber.

12. The apparatus of claim 11 wherein the barrier wall is an outer shell of said float structure, the shell being filled with float-forming material.

13. The apparatus of claim 1 wherein said float structure has a flanged bottom portion and a relatively narrow upper body portion, and seal-forming means includes downwardly facing surfaces on said housing structure and upwardly facing surfaces on said flanged portion of said float structure.

14. The apparatus of claim 1 wherein there is provided seal-forming means which includes a guide channel at each of said two spaced points and into which the adjacent end of said float structure passes as it rises above ground level, and a compressible seal-forming material in each of said channels between the confronting surfaces of float structure and the associated guide channel.

15. The apparatus of claim 8 wherein there is provided on said dry side of said barrier wall support assemblies each having one end connected to the portion of said barrier wall which ends at the top of said barrier wall and an opposite end connected to said housing structure, and said housing structure having support assemblies-engaging backing surfaces which brace the support assemblies against the force of said water or other liquid against the barrier wall when in its raised position.

16. The apparatus of claim 15 wherein the opposite ends of said support assemblies are respectively pivotally connected to said barrier wall and housing structure.

17. The apparatus of claim 16 wherein there is provided at the top of the barrier wall when in its uppermost position a roller guideway-forming member extending horizontally away from the dry side of said barrier wall, said roller guideway-forming member providing a roller guideway inclining downwardly toward the barrier wall where the guideway terminates in a roller-holding recess, and said support assemblies each include a support rod pivotally connected at its bottom to said housing structure and carrying a roller at the top thereof which rides in said inclined guideway, said housing structure having a vertical channel within which each support rod fully retracts when said barrier wall moves into its lowered below ground level position.

18. The apparatus of claim 15 wherein each of said support assemblies includes a series of telescoping sections which, when said barrier wall is in its lowermost position, telescope one inside the other and which, when said barrier wall is in its uppermost position, expand to form an overall strut structure of maximum length.

19. The apparatus of claim 15 wherein there is provided opposite each support assembly an arm extending horizontally away from the dry side of the top of the barrier wall when in its uppermost position, each support assembly further including a vertical support rod connected at the top to one of said arms, said housing structure having a vertical channel for each support rod and within which channel each support rod fully retracts when said barrier wall moves into its lowermost position, the bottom of each support rod moving into the upper portion of the associated channel when the barrier wall rises to its uppermost position so that the defining walls of the upper portion of said channel then provides some lateral support for the associated support assembly.

20. A liquid barrier system which forms an above ground level barrier wall spanning the space between at least two given points to stop liquid flow to one side of said wall, said system comprising:

a structure forming a below ground level float-receiving chamber;

means forming an inlet passageway for ground water or other liquid and directing aid liquid into the bottom of said chamber to fill said chamber;

a float structure for said chamber which is vertically movable therein from a bottommost position therein when there is no liquid build up therein and to an uppermost position when said liquid rises therein when said chamber fills with liquid, there being associated with said float structure a barrier wall-forming means which is initially located at or below ground level when there is no liquid buildup in said chamber and which rises above ground to form a barrier wall when said liquid builds up to a given level in said chamber; and seal-forming means which prevents the liquid from gaining access to said one side of said barrier wall, said seal-forming means includes surfaces on said housing structure and surfaces on said float structure which surfaces engage and are pressed into sealing relation by the buoyancy forces on said float structure.

21. The flood water barrier-forming apparatus of claim 1 or 20 wherein said barrier wall is installed across a downwardly sloping driveway leading to an underground garage and is located between a pair of vertical retaining walls, said retaining walls extending above said top of said driveway, said housing and barrier wall float structures being in the absence of flood risk conditions below said driveway, a pair of seal-forming guide members respectively secured to said retaining walls and forming guide channels for the end of the upper portion of the combined barrier wall and float structure as it moves above the driveway, and seal-forming means in said guide channels for making liquid-tight seals between the ends of said float and barrier wall structure and said channels.

22. The flood water barrier-forming apparatus of claim 1 or 20 wherein said barrier wall is installed across a path with side walls rising above the sides of the path; said housing, barrier wall and float structures being, in the absence of flood risk conditions, below said path; a pair of seal-forming guide members respectively secured to said retaining walls and forming guide channels for the ends of the upper portion of the combined barrier wall and float structure as it moves the path, and seal-forming means in said guide channels for making liquid-tight seals between the ends of said float and barrier wall structure and said channels.

23. The flood water barrier-forming apparatus of claim 22 further provided with an apertured grate which rests on shoulders of a recess in said path to isolate said barrier wall from the weight of persons or vehicles passing thereabove, said grate covering the top of said barrier wall when said barrier wall is retracted below ground level.

24. The flood water barrier-forming apparatus of claim 23 wherein the center of gravity of said grate is located to one side of the upper portion of said barrier wall so that when said structure moves above said roadway said grate is pushed to one side thereof by the rising barrier wall.

25. The flood water barrier-forming apparatus of claim 24 wherein said apparatus is installed in front of a vertical closure of an opening in a building, vertical framing at the vertical margins of said closure, and vertical sealing strips on one of said framing and vertical framing which are compressed by said barrier wall when it rises above ground level to form a water seal along said framing.

26. The apparatus of claim 25 wherein said apparatus includes a set of guide wheels pivotally attached to said barrier wall structure at point to be raised above ground level to engage said vertical framing when said float chamber is being filled with water, said guide wheels being housed in a recess located within said housing structure when said barrier wall structure is below ground level.

27. The apparatus of claim 1 or 20 wherein said barrier wall extends around the periphery of one or more buildings, to isolate the perimeters of the same from flood water.

28. The flood water barrier-forming apparatus of claim 13 wherein said housing structure includes a main body portion having a float chamber formed therein which opens to the top thereof, said combined barrier wall and float structure being vertically removable from said float chamber when the various portions of said float chamber is devoid of any closures, and a pair of float chamber closing head blocks removably attachable to the upper portion of said float chamber after said combined barrier wall and float structure is mounted therein, and forming therebetween a space through which said narrow upper body portion of the latter structure can pass as it rises in said chamber, the bottom of said head blocks forming said downwardly facing surfaces of said housing structure.

29. The apparatus of claim 28 wherein said flange portion of said float structure has vertical guide rod-receiving openings passing therethrough, and guide rods secured to said housing structure which means guide said combined barrier wall and float structure for vertical movement in said float chamber.

30. The apparatus of claim 1 installed in a farming area to form a flood water barrier wall, said barrier wall enclosing said farming area, at least one pillar extending upward above ground level to a height higher than a maximum expected flood level, said pillar having on each of the opposite vertical sides thereof a guide channel into which adjacent ends of said float structure is guided as it rises above ground level; a compressible seal-forming material in each of said channels between said float structure and the associated guide channel; said pillar having a flood water inlet on the side thereof facing the source of flood water, a water storage vessel inside the area to be enclosed by said barrier wall, a conduit for flood water at or near ground level extending through said pillar and having an inlet opening to receiving flood water and an inlet end connected to the bottom portion of said vessel for allowing flood water to flow into said vessel, and a one-way valve in said conduit permitting passage of flood water into said storage vessel but preventing leakage of water from said vessel.

31. The apparatus of claim 30 wherein said vessel has an air exhaust aperture in the top thereof, and said vessel has a storage height at or above the height of the maximum expected flood level so that flood water can partially fill but not overflow said vessel.

32. The apparatus of claim 30 wherein there is provided in communication with the bottom portion of said vessel an irrigation water discharge opening, and an on-off valve for opening and closing said opening to permit discharge of water stored in said vessel.

33. The apparatus of claim 30 wherein said framing area includes a drainage system for draining water buildup in said farming area, drainage system including a sump pump-containing chamber below ground level, water in said farming area draining into said sump pump-containing chamber, and a sump pump in said chamber having its inlet opening onto said chamber and its outlet connected to said tank so that the water in said chamber is directed to said storage vessel.

34. The apparatus of claim 33 wherein said pump outlet is connected to said conduit at the inlet side of said one-way valve, wherein excess water drainage can be directed to said storage vessel, said conduit at the upstream side of the point where said water outlet of said pump connects with said conduit inclining upwardly away from said point so that he water discharged by said pump flows through said one-way valve into said storage vessel.

35. The apparatus of claim 1 wherein said barrier wall completely encloses a given area in which a spill of a hazardous chemical is possible from a leaking storage vessel or the like, a first storage vessel in said area containing said hazardous liquid, a second storage vessel in said area to store said hazardous chemical should it leak from said first vessel, said float-receiving chamber being devoid of any draining means so that said chamber will immediately begin to fill with said liquid when liquid flows into the same, said barrier wall then immediately rising above ground level to protect the area outside said given area on one side of the barrier wall from contact with said hazardous liquid, and means for automatically feeding the hazardous liquid flowing into said float-receiving chamber into said second storage vessel and preventing the liquid in said vessel from flowing back into said chamber.

36. The apparatus of claim 1 or 3 wherein said barrier wall is initially installed in the ground below an opening in a levee or the like, across which the barrier wall will rise and seal the levee opening when flood conditions develop on one side of the levee, the barrier wall carries on top thereof a track segment which bridges the track section on opposite sides of the levee.

37. The apparatus of claim 1 or 3 wherein said barrier wall carries on the top thereof a track segment which is capable of bridging the track section on opposite sides of the levee.

38. The apparatus of claim 36 wherein said track segment is, in the retracted position of the barrier wall, slightly below the level of the track section on opposite sides of said opening, so that only a train wheel flange will engage said track segment so that the barrier wall does not support the weight of the train.

39. A barrier-forming apparatus for presenting under flood risk conditions an above ground barrier spanning across a roadway and positioned before a potentially flooding area of said roadway, said barrier-forming apparatus comprising:

a housing structure to be buried below ground level, said housing structure having a float receiving chamber and at least one ground liquid inlet passageway so that ground water can fill said chamber when flood risk conditions exist;

a float structure for said chamber vertically movable from a bottommost position in said chamber when there is no water buildup therein to given level to an uppermost position when said chamber fills with water;

and there being associated with said float structure for movement therewith a barrier wall-forming structure which is not located across and above said roadway when said float structure is in said bottommost position and forms such a barrier wall across said roadway when flood conditions exist and water fills said chamber.

40. The barrier-forming apparatus of claim 39 wherein there is provided liquid draining means communicating with the bottom of said chamber for draining liquid from the bottom thereof to prevent the buildup of liquid in said chamber to said given level except under flood risk conditions.

41. The barrier-forming apparatus of claim 39 wherein said barrier wall-forming structure includes a pivotally-mounted, cantilevered, normally upright gate to be pivoted and lowered to cross said roadway, and linkage mechanism between said float structure and gate which pivots the gate to lower the same when said float structure is in said upright position.

42. The barrier-forming apparatus of claim 39 further providing a warning sign positioned within said barrier-forming structure, said sign rising correspondingly with said barrier -forming structure under flood risk conditions.

43. The barrier-forming apparatus of claim 39 wherein said apparatus is further installed across said roadway after an exit ramp and before said flooding area.

44. The barrier-forming apparatus of claim 39 wherein said barrier forming-wall is a normally, upright, pivotally-mounted gate, linkage mechanism coupling said float structure land gate to pivot and lower the gate into a horizontal position over and across said roadway, and a second barrier wall structure behind said gate and initially fully located below said roadway and having a separate float-receiving chamber which slowly fills with water causing said barrier wall structure to slowly rise above the roadway to interrupt passage of vehicles, said float chamber associated with said gate rapidly filing with water so that the gate is lowered before said second barrier wall rises above the roadway.

* * * * *